United States Patent
Hagadorn et al.

(10) Patent No.: US 9,321,858 B2
(45) Date of Patent: Apr. 26, 2016

(54) PYRIDYLDIAMIDE METAL CATALYSTS AND PROCESSES TO PRODUCE POLYOLEFINS

(71) Applicant: ExxonMobil Chemical Patents Inc., Baytown, TX (US)

(72) Inventors: John R. Hagadorn, Houston, TX (US); Ilya S. Borisov, Moscow (RU); Arkady K. Golenishchev, Moscow (RU); Dmitry V. Uborsky, Moscow (RU); Alexander Z. Voskoboynikov, Moscow (RU); Oleg V. Samsonov, Buzdyak (RU); Michail I. Sharikov, Efremov (RU)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/258,121

(22) Filed: Apr. 22, 2014

(65) Prior Publication Data
US 2014/0316089 A1 Oct. 23, 2014

Related U.S. Application Data

(60) Provisional application No. 61/815,065, filed on Apr. 23, 2013.

(51) Int. Cl.
C08F 4/76 (2006.01)
C08F 10/00 (2006.01)
C08F 4/69 (2006.01)

(52) U.S. Cl.
CPC ............. *C08F 10/00* (2013.01); *C08F 4/6937* (2013.01)

(58) Field of Classification Search
CPC ........................... C08F 4/6937; C08F 4/64148
USPC ........................................................ 526/172
See application file for complete search history.

(56) References Cited

U.S. PATENT DOCUMENTS

| | | | |
|---|---|---|---|
| 6,953,764 | B2 | 10/2005 | Frazier et al. |
| 7,973,116 | B2 * | 7/2011 | Hagadorn et al. ............ 526/172 |
| 8,394,902 | B2 * | 3/2013 | Hagadorn et al. ............ 526/172 |
| 2005/0137367 | A1 | 6/2005 | Kuchta et al. |
| 2006/0135722 | A1 | 6/2006 | Boussie et al. |
| 2007/0191607 | A1 | 8/2007 | Solan et al. |
| 2011/0224391 | A1 | 9/2011 | Hagadorn et al. |
| 2011/0301310 | A1 | 12/2011 | Hagadorn et al. |
| 2012/0071616 | A1 | 3/2012 | Hagadorn et al. |

FOREIGN PATENT DOCUMENTS

| WO | WO 2005/095469 | 10/2005 |
|---|---|---|
| WO | WO 2007/130242 | 11/2007 |
| WO | WO 2007/130306 | 11/2007 |
| WO | WO 2008/112133 | 9/2008 |
| WO | WO 2012/134614 | 10/2012 |

OTHER PUBLICATIONS

U.S. Appl. No. 61/815,065, filed Apr. 23, 2013, Hagadorn et al.
Domski et al., "Synthesis of a New Olefin Polymerization Catalyst Supported by an $sp^3$ -C Donor via Insertion of a Ligand-Appended Alkene into the Hf-C Bond of a Neutral Pyridylamidohafnium Trimethyl Complex," Chem. Commun., 2008, 46, pp. 6137-6139.
Luconi et al., "Yttrium-Amidopyridinate Complexes: Synthesis and Characterization of Yttrium-Alkyl and Yttrium-Hydrido Derivatives," European Journal of Inorganometallics Chemistry, 2010, vol. 10, Issue 4, pp. 608-620.
Lyubov et al., "Selective σ-Bond Metathesis in Alkyl-Aryl and Alkyl-Benzyl Yttrium Complexes. New Aryl- and Benzyl-Hydrido Yttrium Derivatives Supported by Amidopyridinate Ligands," Organometallics, 2009, 28, pp. 1227-1232.
Mase et al., "Synthesis of a Muscarinic Receptor Antagonist via a Diastereoselective Michael Reaction, Selective Deoxyfluorination and Aromatic Metal-Halogen Exchange Reaction," Journal of Organic Chemistry, 2001, vol. 66, pp. 6775-6786.
Steele et al., "Synthesis of New Sterically Hindered Anilines," Eur. Journal of Organic Chemistry, 2007, pp. 3091-3094.

* cited by examiner

*Primary Examiner* — Rip A Lee

(57) ABSTRACT

Disclosed are new classes of pyridyldiamide catalyst components useful in olefin polymerization, an example of which includes:

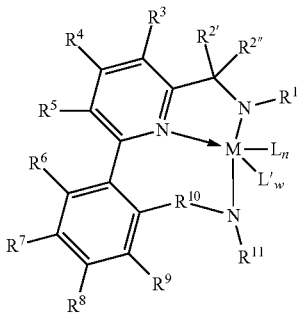

wherein M is a hafnium or zirconium; $R^1$ and $R^{11}$ are selected from phenyl and substituted phenyl, wherein the substitutions are selected from $C_1$ to $C_5$ hydrocarbyls, preferably $C_2$ to $C_4$ hydrocarbyls, and can reside in any of the ortho, meta, para positions on the phenyl ring; $R^{2'}$ and $R^{2''}$ are selected independently from hydrogen and $C_1$ to $C_6$ hydrocarbyls, preferably hydrogen; $R^{10}$ is a hydrocarbyl bridging group; $R^3$, $R^4$, and $R^5$ are independently selected from hydrogen, hydrocarbyls, and substituted hydrocarbyls; and $R^6$, $R^7$, $R^8$, and $R^9$ are independently selected from hydrogen, hydrocarbyls, and substituted hydrocarbyls; wherein $R^6$ and $R^7$ form an aromatic ring or $R^7$ is hydrogen and $R^6$ is selected from methyl, ethyl, propyl, isopropyl, butyl, sec-butyl, and tert-butyl, preferably methyl.

22 Claims, 1 Drawing Sheet

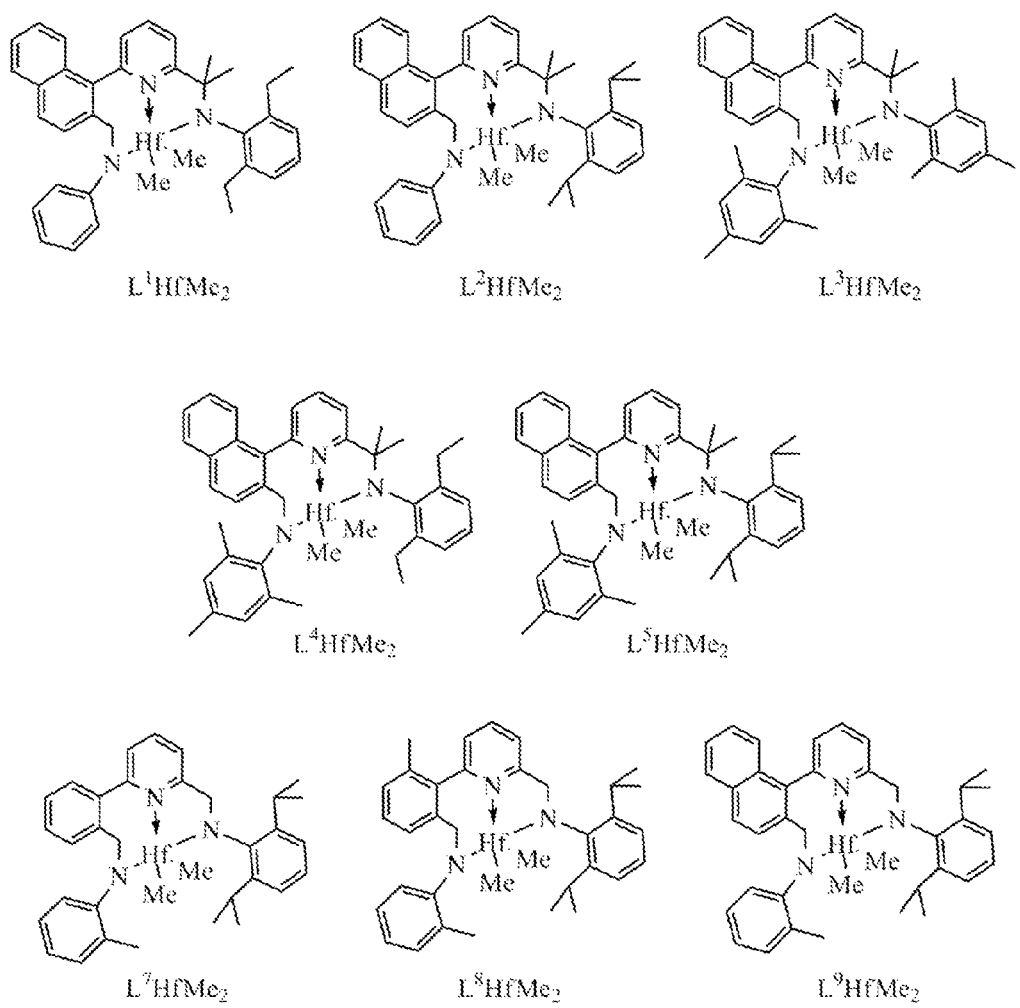

PYRIDYLDIAMIDE METAL CATALYSTS AND PROCESSES TO PRODUCE POLYOLEFINS

PRIORITY

This application claims priority to and the benefit of U.S. Ser. No. 61/815,065, filed Apr. 23, 2013.

FIELD OF THE INVENTION

This invention relates to classes of pyridyldiamide metal catalysts components and their use in the polymerization of ethylene and/or propylene.

BACKGROUND OF THE INVENTION

Though single-site polymerization catalysts for polyolefin polymerization are well known, there is still a desire for higher activity catalysts capable of operating at high temperatures, and capable of producing crystalline polymers with specific melting points and degrees of crystallinity. There is also a need to understand how to tailor such catalysts such that the polymers produced from these catalysts can be fine-tuned to meet a variety of commercial needs. It would be desirable to utilize the same class of compounds within a given class of catalyst compounds that have similar reactor behavior so that different products can be produced without major disruption in the overall commercial production of polymer.

WO 2007/130306 and WO 2007/130242 disclose transition metal imidazoldiyl olefin polymerization catalysts that are distinct from the present invention. U.S. Pat. No. 6,953,764 discloses pyridyl amide catalysts for olefin polymerization that are distinct from the present invention. Pyridyldiamide catalysts have been described in U.S. Pat. No. 7,973,116; US 2011/0224391; US 2011/0301310; and US 2012/0071616. These pyridyldiamide catalysts are useful in making polyolefins.

The inventors here have found a class of pyridyldiamide catalyst compounds (or "components") whose structure can be varied to adjust the properties of the resulting polyolefin, especially polypropylene and polyethylene.

SUMMARY OF THE INVENTION

Disclosed are two classes of pyridyldiamide metal catalyst components, and processes for using these to polymerize olefins, especially α-olefins, to form polyolefins. A first class of pyridyldiamide metal catalyst components is represented by general formula (1) or (2):

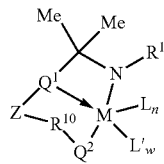

(1)

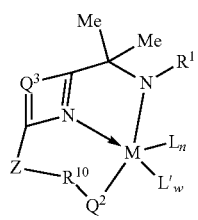

(2)

wherein:

M is a Group 3, 4, 5, 6, 7, 8, 9, 10, 11, or 12 metal;
$Q^1$ is a three atom bridging group described further herein;
$Q^2$ is a group that may form a bond with M, including, but not limited to a group 16 element (such as O or S) or $NR^{17}$ or $PR^{17}$, where $R^{17}$ is selected from hydrogen, hydrocarbyls, substituted hydrocarbyls, alkoxy, aryloxy, halogen, amino, and silyl;

$Q^3$ is -(TT)- or -(TTT)-, where each T is carbon or a heteroatom, preferably C, O, S, or N), and said carbon or heteroatom may be unsubstituted (e.g., hydrogen is bound to the carbon or heteroatom) or substituted with one or more $R^{30}$ groups, that, as part of the "—C-$Q^3$=C—" fragment, forms a 5- or 6-membered cyclic group or a polycyclic group including the 5 or 6 membered cyclic group;

$R^1$ is selected from the group consisting of hydrocarbyls, substituted hydrocarbyls, silyl, or substituted silyl groups;

$R^{10}$ is -$E(R^{12})(R^{13})$—, with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring;

Z is —$(R^{14})_p$C—C$(R^{15})_q$—, which is a bridging group, where $R^{14}$ and $R^{15}$ are independently selected from the group consisting of hydrogen, hydrocarbyls, and substituted hydrocarbyls, and wherein adjacent $R^{14}$ and $R^{15}$ groups, having the "C—C" group therebetween, may be joined to form an aromatic or saturated, substituted or unsubstituted hydrocarbyl ring, where the ring has 5, 6, 7, or 8 ring carbon atoms and where substitutions on the ring can join to form additional rings, p is 1 or 2 and q is 1 or 2;

L is an anionic leaving group, where the L groups may be the same or different and any two L groups may be linked to form a dianionic leaving group, and n is 0, 1, 2, 3, or 4; and L' is neutral Lewis base, and w is 0, 1, 2, 3, or 4.

A second class of pyridyldiamide metal catalyst components may be represented by general formula (5) or (6):

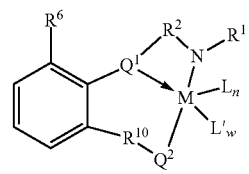

(5)

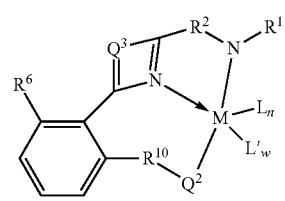

(6)

where, preferably, $R^6$ is a hydrocarbyl or substituted hydrocarbyl, and preferably, may be selected from $C_1$ to $C_{12}$ hydrocarbyls; more preferably $C_1$ to $C_3$ hydrocarbyls, and the other groups ($R^1$, $R^2$, $Q^1$, $R^{10}$, $Q^2$, M, L, L', n, w, and $Q^3$) are as defined herein.

BRIEF DESCRIPTION OF THE DRAWINGS

FIG. 1 includes chemical drawings representing the inventive and comparative pyridyldiamide metal catalyst components.

DETAILED DESCRIPTION

Unless otherwise indicated, room temperature is 23° C.
As used herein, the numbering scheme for the Periodic Table groups is the new notation as set out in Chemical and Engineering News, 63(5), 27 (1985).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

Unless otherwise noted, all molecular weights units (e.g., Mw, Mn, Mz) are g/mol.

Pyridyldiamides are known to be good olefin polymerization catalysts. Described herein is a new structural variant that introduces a quaternary carbon center into the ligand backbone at a site that may be prone to unwanted decomposition chemistry. Also, described is a new structural variant that introduces a methyl-substituted phenyl linker group into the ligand backbone. This substitution, relative to the unsubstituted phenyl linker group, leads to catalysts for propylene polymerization that produce polypropylene with higher crystallinity. These catalyst may also be useful in making propylene-based elastomers.

Described herein, broadly, are two classes of pyridyldiamide metal catalyst complexes (or "components"). The first class can be represented by a pyridyldiamide metal catalyst component having the general formula (1) or (2):

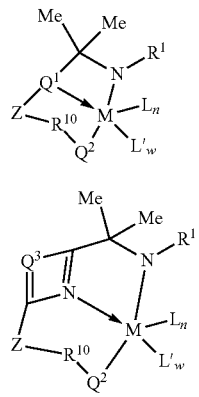

wherein:

M is a Group 3-12 metal, more preferably a Group 4 or 5 metals, and more preferably a zirconium or hafnium, even more preferably a hafnium;

$Q^1$ is a three atom bridging group represented by the formula $-G^1-G^2-G^3-$, each of which may be independently substituted with $R^{30}$ and/or $R^{31}$ groups, where $G^2$ is a group 15 or 16 atom, $G^1$ and $G^3$ are each a group 14, 15, or 16 atom, where $G^1$, $G^2$ and $G^3$, or $G^1$ and $G^2$, or $G^1$ and $G^3$, or $G^2$ and $G^3$ may form a singular or multi-ring system, and if any of $G^1$ and/or $G^3$ is a group 14 atom then $R^{30}$ and $R^{31}$ are bound to such G atom(s), and if any of $G^1$, $G^2$ and/or $G^3$ is a group 15 atom then $R^{30}$ is bound to such G atom(s), where each $R^{30}$ and $R^{31}$ is, independently, hydrogen or a $C_1$ to $C_{20}$ or $C_{50}$ or $C_{100}$ hydrocarbyl group; where most preferably $Q^1$ of (1) or the $Q^3$ ring of (2) form a pyridine ring which may be substituted with $C_1$ to $C_6$ hydrocarbyls, or unsubstituted hydrocarbyls; and where any one of $G^1$, $G^2$ or $G^3$ may form a bond, preferably a dative bond, to M;

$Q^2$ is a group that forms a bond, preferably an anionic bond, with M, including, but not limited to a group 16 element (such as O or S) or $NR^{17}$ or $PR^{17}$, where $R^{17}$ is selected from hydrogen, hydrocarbyls, substituted hydrocarbyls, alkoxy, aryloxy, halogen, amino, and silyl; and most preferably $Q^2$ forms an aniline, where the nitrogen is bound to the metal, and which may be substituted with $C_1$ to $C_6$ hydrocarbyls, or unsubstituted hydrocarbyls;

$Q^3$ is -(TT)- or -(TTT)-, where each T is carbon or a heteroatom, and each carbon or heteroatom may independently be substituted by hydrogen or one or more $R^{30}$ groups, and as part of the "—C-$Q^3$=C—" fragment forms a 5- or 6-membered cyclic group or a polycyclic group including the 5 or 6 membered cyclic group; and preferably the $Q^3$ ring of (2) forms a pyridine ring which may be substituted with $C_1$ to $C_6$ hydrocarbyls;

$R^1$ is selected from the group consisting of hydrocarbyls, substituted hydrocarbyls, silyl, or substituted silyl groups; and is preferably a phenyl or substituted phenyl, and when substituted, the substituents are preferably $C_1$ to $C_6$ hydrocarbyls, most preferably in the ortho positions;

$R^{10}$ is $-E(R^{12})(R^{13})-$ (where it is understood that each of $R^{12}$ and $R^{13}$ are bound to E by a chemical bond), with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

Z is $-(R^{14})_pC-C(R^{15})_q-$, where $R^{14}$ and $R^{15}$ are independently selected from the group consisting of hydrogen, hydrocarbyls, and substituted hydrocarbyls, and wherein adjacent $R^{14}$ and $R^{15}$ groups, having the "C—C" group therebetween, may be joined to form an aromatic or saturated, substituted or unsubstituted hydrocarbyl ring, where the ring has 5, 6, 7, or 8 ring carbon atoms and where substitutions on the ring can join to form additional rings, p is 1 or 2 and q is 1 or 2;

L is an anionic leaving group, where the L groups may be the same or different and any two L groups may be linked to form a dianionic leaving group, and n is 0, 1, 2, 3, or 4; preferably L is a $C_1$ to $C_6$ hydrocarbyl, a $C_6$ to $C_{12}$ aryl or substituted aryl, or a halogen; and L' is neutral Lewis base, and w is 0, 1, 2, 3, or 4; preferably the "neutral Lewis base" is any neutral molecule that contains a lone pair of electrons that could bind to the catalyst metal center. Typical examples include ethers, thioethers, amines, and/or phosphines.

As used herein, a "hydrocarbyl" is a radical (at least a single radical) made of carbon and hydrogen, in any configuration (branched, linear, cis-, trans-, secondary, tertiary, etc.). A "substituted hydrocarbyl" is a hydrocarbyl that is substituted in one or more positions with a heteroatom or heteroatom group such as a hydroxyl group, carboxy group, ester, amine, silyl, halogen, haloalkyl, etc. Preferably, hydrocarbyls are selected from $C_1$ to $C_6$ or $C_{10}$ or $C_{12}$ alkyls, $C_6$ to $C_{12}$ aryls, and/or $C_7$ to $C_{20}$ alkylaryls.

More preferably, the first class of pyridyldiamide metal catalyst components is represented by the formula (3) or (4):

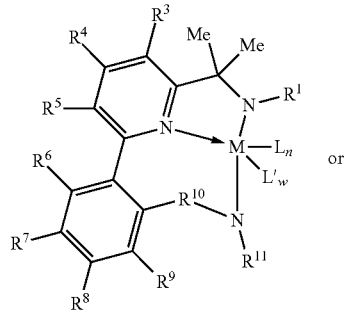

(3)

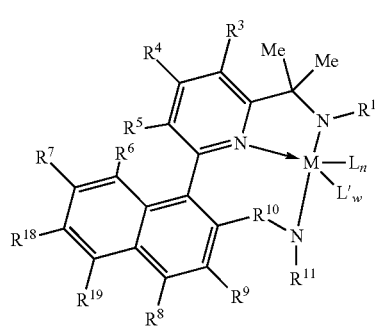

(4)

wherein:

M is a Group 3-5 metal, or as described above for (1) and (2);

$R^1$ and $R^{11}$ are independently selected from the group consisting of hydrocarbyls, substituted hydrocarbyls, silyl groups, or substituted silyl groups;

$R^{10}$ is -E($R^{12}$)($R^{13}$)—, with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ and $R^4$ and/or $R^4$ and $R^5$) may be joined to form a substituted or unsubstituted hydrocarbyl or heterocyclic ring, where the ring has 5, 6, 7, or 8 ring atoms and where substitutions on the ring can join to form additional rings;

$R^6$, $R^7$, $R^8$, $R^9$, $R^{18}$, and $R^{19}$ are independently selected from the group consisting of hydrogen, hydrocarbyls, substituted hydrocarbyls, alkoxy, halogen, amino, and silyl, and wherein adjacent R groups ($R^6$ and $R^7$, and/or $R^8$ and $R^9$, and in (4) $R^7$ and $R^{18}$, and/or $R^{18}$ and $R^{19}$) may be joined to form a saturated, substituted or unsubstituted hydrocarbyl or heterocyclic ring, where the ring has 5, 6, 7, or 8 ring carbon atoms and where substitutions on the ring can join to form additional rings; and L and L', along with n and w, are as described above.

For structures (1) to (4), there are some more preferred configurations. For instance, $R^{10}$ may be selected from $C_1$ to $C_4$ divalent hydrocarbyls, most preferably a $C_1$ or $C_2$ alkylene. Preferably, $R^1$ is selected from phenyl and substituted phenyl, wherein the substitutions are selected from $C_1$ to $C_5$ hydrocarbyls, preferably $C_2$ to $C_4$ hydrocarbyls, and can reside in any of the ortho, meta, para positions on the phenyl ring. Preferably, $R^{11}$ may be selected from phenyl and substituted phenyl, wherein the phenyl substitutions are selected from $C_1$ to $C_5$ hydrocarbyls, preferably $C_1$ hydrocarbyls, and can reside in any of the ortho, meta, para positions on the phenyl ring.

The invention also includes a second class of pyridyldiamide metal catalyst components having the general formula (5) or (6):

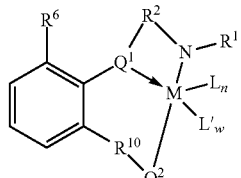

(5)

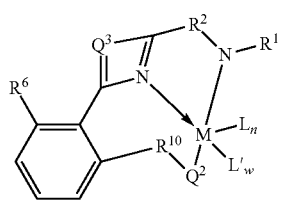

(6)

wherein:

M is a Group 3-12 metal; or more preferably as described above for (1) and (2);

$Q^1$, $Q^2$ and $Q^3$ are as described above for (1) and (2);

$R^1$ is selected from the group consisting of hydrocarbyls, substituted hydrocarbyls, silyl, or substituted silyl groups; or as described above for (1) and (2);

$R^6$ is selected from $C_1$ to $C_{12}$ hydrocarbyls; more preferably $C_1$ to $C_3$ hydrocarbyls;

$R^2$ and $R^{10}$ are each, independently, -E($R^{12}$)($R^{13}$)—, with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings; and, more preferably, $R^2$ and $R^{10}$ are as described above for (1) and (2); and L and L', along with n and w, are as described above.

$R^2$ and $R^{10}$ are not required to be substituted, however, one of $R^2$ and $R^{10}$ may be asymmetrically substituted while the other is symmetrically substituted, or both may be asymmetrically substituted.

More preferably, the second class of inventive pyridyldiamide metal catalyst components is represented by the formula (7):

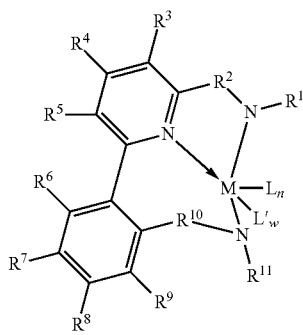

(7)

wherein:

M is a Group 3, 4 or 5 metal; and more preferably as described above for (1) and (2);

$R^1$ and $R^{11}$ are independently selected from the group consisting of hydrocarbyls, substituted hydrocarbyls, silyl, or substituted silyl groups;

$R^2$ and $R^{10}$ are each, independently, -E($R^{12}$)($R^{13}$)—, with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ and $R^4$, and/or $R^4$ and $R^5$) may be joined to form a substituted or unsubstituted hydrocarbyl or heterocyclic ring, where the ring has 5, 6, 7, or 8 ring atoms and where substitutions on the ring can join to form additional rings;

$R^6$ is selected from groups containing 1 to 12 carbons, preferably $C_1$ to $C_3$ hydrocarbyls, most preferably methyl;

$R^7$, $R^8$, and $R^9$ are independently selected from the group consisting of hydrogen, hydrocarbyls, substituted hydrocarbyls, alkoxy, halogen, amino, and silyl, and wherein adjacent R groups ($R^6$ and $R^7$ and/or $R^8$ and $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and L and L', along with n and w, are as described above.

As with (5) and (6) above, $R^2$ and $R^{10}$ in (7) are not required to be substituted, however, one of $R^2$ and $R^{10}$ may be asymmetrically substituted while the other is symmetrically substituted, or both may be asymmetrically substituted.

For structures (5) to (7), there are some more preferred configurations. For instance, $R^{10}$ is preferably selected from $C_1$ to $C_4$ divalent hydrocarbyl radicals, most preferably a $C_1$ or $C_2$ alkylene. Also, $R^1$ is preferably selected from phenyl and substituted phenyl, wherein the substitutions are selected from $C_1$ to $C_5$ hydrocarbyls, preferably $C_2$ to $C_4$ hydrocarbyls, and can reside in any of the ortho, meta, para positions on the phenyl ring. $R^{11}$ is preferably selected from phenyl and substituted phenyl, wherein the substitutions are selected from $C_1$ to $C_5$ hydrocarbyls, preferably methyl, and can reside in any of the ortho, meta, para positions on the phenyl ring. And finally, $R^6$ is preferably selected from methyl, ethyl, propyl, isopropyl, butyl, sec-butyl, and tert-butyl; most preferably ethyl or methyl.

The pyridyldiamide catalyst components are typically used along with a so-called "NCA" or "MAO" activator, both of which are well known classes of "activators", to polymerize ethylene and/or $C_3$ to $C_{10}$ or $C_{20}$ olefins to form polyolefins, preferably propylene homopolymers and copolymers or ethylene homopolymers and copolymers. Different catalyst components are preferred for propylene polymerization and ethylene polymerization. The catalyst components may be supported, alone or with the activator, and may be used in any polymerization process known in the art, especially solution or slurry polymerization, or combinations of various methods. Further, the catalyst components can be used in one or multiple reactors, and can preferably be used alone, without additional catalyst components, in forming block copolymers. The inventive pyridyldiamide metal catalyst components are particularly useful in higher temperature (relative to metallocene-type catalyst components) polymerization processes, especially those above 70 or 80 or 90° C., up to 120 or 140° C.

The invention thus includes a process to produce polypropylenes, or propylene-based copolymers and elastomers, using a pyridyldiamide metal catalyst component, comprising combining propylene, and optionally ethylene or $C_4$ to $C_{12}$ olefins, most preferably 1-butene, 1-hexene or 1-octene, with a catalyst component and activator, the catalyst component comprising (8):

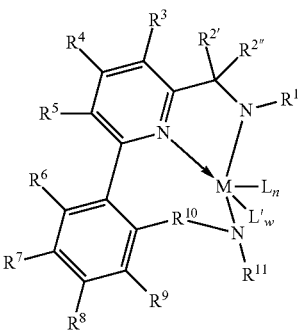

(8)

wherein:

M is a Group 3, 4 or 5 metal; most preferably zirconium or hafnium, and most preferably hafnium;

$R^1$ and $R^{11}$ are independently selected from the group consisting of hydrocarbyls, substituted hydrocarbyls, silyl, or substituted silyl groups;

$R^{2'}$ and $R^{2''}$ are selected independently from hydrogen and $C_1$ to $C_6$ hydrocarbyls, preferably methyl or hydrogen, most preferably hydrogen; and the other groups are as described above; and wherein as the steric hindrance created in the $R^6$ group, with respect to the $R^5$ group, is increased, the peak melting point temperature of the polypropylene produced increases within a range of from 120 or 130° C. to 145 or 150° C.

By "steric hindrance", what is meant is that characteristic of molecular structure of the catalyst component in which the atoms or groups pendant from the atoms on the catalyst component have a spatial arrangement of the atoms or groups that causes steric strain, or additional energy or molecular bonds due to the peculiar molecular geometry, or, stated another way, strain resulting from van der Vaals repulsion when two atoms or groups in the catalyst component approach each other with a distance less than the sum of their van der Waals radii. Such steric strain is well known in the chemical arts. Thus, in the case of the catalyst component represented in (8), the $R^5$ and $R^6$ groups may interact such that they cause the rings to which they are attached to bend away from the plane they exist in when both $R^5$ and $R^6$ are hydrogens.

There are some most preferred configurations for the catalyst component (8). For instance, $R^{2'}$ and $R^{2''}$ are preferably hydrogen or methyl, most preferably hydrogen. Also, $R^7$ is preferably hydrogen and $R^6$ is selected from methyl, ethyl, propyl, isopropyl, butyl, sec-butyl, and tert-butyl; preferably methyl.

Most preferably, $R^{2'}$ and $R^{2''}$ are each methyl and the activity of the catalyst component is greater than 20,000 or 25,000 g polymer/mmol catalyst/hour, or within the range of from 20,000 or 25,000 or 50,000 g polymer/mmol catalyst/hour to 300,000 or 400,000 or 500,000 g polymer/mmol catalyst/hour. In any case, regardless of the substitutions, the propylene homopolymer or copolymer generated from a process including, or consisting essentially of, or consisting of (8) and an activator, has a molecular weight distribution (Mw/Mn, also referred to as polydispersity index or PDI) of less than 2.5 or 2.2 or 2.0; or within the range of from 1.0 or 1.2 or 1.4 to 2.0 or 2.2. or 2.5.

"Polypropylene(s)" include homopolymers of propylene, copolymers of propylene and ethylene and/or $C_4$ to $C_{12}$ α-olefins, or propylene-based elastomers which are also copolymers with ethylene and/or $C_4$ to $C_{12}$ α-olefins that may also include dienes. Suitable dienes include, for example: 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof. More particularly, the homopolymers or copolymers of propylene comprise from 60 wt % or 70 wt % or 80 wt % or 85 wt % or 90 wt % or 95 wt % or 98 wt % or 99 wt % to 100 wt % propylene-derived units (and comprising within the range of from 0 wt % or 1 wt % or 5 wt % to 10 wt % or 15 wt % or 20 wt % or 30 wt % or 40 wt % $C_2$ and/or $C_4$ to $C_{10}$ α-olefin derived units), by weight of the polymer. The propylene-based elastomer, a special case of a copolymer, preferably has a melting point of less than 110° C. or 100° C. or 90° C. or 80° C.; and preferably within the range of from 10° C. or 15° C. or 20° C. or 25° C. to 65° C. or 75° C. or 80° C. or 95° C. or 105° C. or 110° C., and a heat of fusion ($H_f$), determined according to the Differential Scanning calorimetry (DSC) within the range of from 0.5 J/g or 1 J/g or 5 J/g to 35 J/g or 40 J/g or 50 J/g or 65 J/g or 75 J/g.

The invention also includes a process to produce ethylene copolymers using a pyridyldiamide metal catalyst component, comprising combining ethylene, and $C_3$ to $C_{12}$ olefins, preferably propylene, 1-hexene or 1-octene, with a catalyst component and activator, the catalyst component comprising (9):

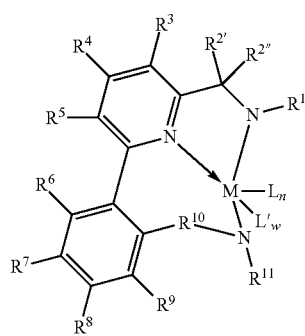

(9)

wherein:
M is a Group 3-5 metal; preferably zirconium or hafnium, most preferably hafnium;

$R^1$ and $R^{11}$ are independently selected from the group consisting of hydrocarbyls, substituted hydrocarbyls, or silyl groups;

$R^{2'}$ and $R^{2''}$ are selected independently from hydrogen and $C_1$ to $C_6$ hydrocarbyls, preferably hydrogen; and the other groups are as defined above; and wherein as the reaction temperature is increased, the peak melting point temperature of the ethylene copolymer produced increases. More preferably, the polymerization of ethylene alone or with comonomers in the presence of (9) can take place at a desirable temperature within the range, wherein the lower reaction temperature range is within the range of from 70 to 90° C. and the upper reaction temperature range is within the range of from 100 to 110° C. and the melting point temperature of the ethylene copolymer increases by at least 5 or 10° C.

"Ethylene copolymers" or ethylene-based polyolefins that comprise at least 50 or 60 or 70 or 80 wt %, by weight of the polymer, of ethylene-derived units.

Preferably, $R^{2'}$ and $R^{2''}$ are hydrogen or methyl, preferably methyl in (9), and preferably $R^6$ and $R^7$ form an aromatic ring or $R^7$ is hydrogen and $R^6$ is selected from methyl, ethyl, propyl, isopropyl, butyl, sec-butyl, and tert-butyl, preferably methyl. In any case, regardless of the substitutions, the ethylene homopolymer or copolymer generated from a process including, or consisting essentially of, or consisting of (9) and an activator, has a molecular weight distribution (Mw/Mn) of less than 2.5 or 2.2 or 2.0; or within the range of from 1.0 or 1.2 or 1.4 to 2.0 or 2.2. or 2.5.

Activators

After the complexes have been synthesized, catalyst systems may be formed by combining them with activators in any manner known from the literature including by supporting them for use in slurry or gas phase polymerization. The catalyst systems may also be added to or generated in solution polymerization or bulk polymerization (in the monomer). The catalyst system typically comprises a complex as described above and an activator such as alumoxane or a non-coordinating anion. Activation may be performed using alumoxane solution including methyl alumoxane, referred to as MAO, as well as modified MAO, referred to herein as MMAO, containing some higher alkyl groups to improve the solubility. Particularly useful MAO can be purchased from Albemarle in a 10 wt % solution in toluene. The catalyst system employed in the present invention preferably uses an activator selected from alumoxanes, such as methyl alumoxane, modified methyl alumoxane, ethyl alumoxane, iso-butyl alumoxane, and the like.

When an alumoxane or modified alumoxane is used, the complex-to-activator molar ratio is from about 1:3000 to 10:1; alternatively, 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-complex ratio is 1:1 molar ratio.

Activation may also be performed using non-coordinating anions, referred to as NCA's, of the type described in EP 277 003 A1 and EP 277 004 A1. NCA may be added in the form of an ion pair using, for example, [DMAH]$^+$ [NCA]$^-$ in which the N,N-dimethylanilinium (DMAH) cation reacts with a basic leaving group on the transition metal complex to form a transition metal complex cation and [NCA]$^-$. The cation in the precursor may, alternatively, be trityl. Alternatively, the transition metal complex may be reacted with a neutral NCA precursor, such as B($C_6F_5$)$_3$, which abstracts an anionic group from the complex to form an activated species. Useful activators include N,N-dimethylanilinium tetrakis(pentafluorophenyl)borate (i.e., [PhNMe$_2$H]B(C$_6$F$_5$)$_4$) and N,N-dimethylanilinium tetrakis(heptafluoronaphthyl)borate, where Ph is phenyl, and Me is methyl.

Additionally, preferred activators useful herein include those described in U.S. Pat. No. 7,247,687 at column 169, line 50 to column 174, line 43, particularly column 172, line 24 to column 173, line 53.

When an NCA (such as an ionic or neutral stoichiometric activator) is used, the complex-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Alternately, a co-activator may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277 003 A1 and EP 0 277 004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (II):

$$(Z)_d^+(A^{d-}) \quad\quad\quad (II)$$

wherein Z is (L-H) or a reducible Lewis Acid, L is a neutral Lewis base; H is hydrogen; (L-H)$^+$ is a Bronsted acid; A$^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation (L-H)$_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N, N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it is preferably represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl. In a preferred embodiment, the reducible Lewis acid is triphenyl carbenium.

The anion component A$^{d-}$ includes those having the formula [M$^{k+}$Q$_n$]$^{d-}$ wherein k is 1, 2, or 3; n is 1, 2, 3, 4, 5, or 6, preferably 3, 4, 5 or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In a preferred embodiment, this invention relates to a method to polymerize olefins comprising contacting olefins (preferably ethylene and or propylene) with the catalyst compound and a boron containing NCA activator represented by the formula (14):

$$Z_d^+ (A^{d-}) \quad (14)$$

where: Z is (L-H) or a reducible Lewis acid; L is a neutral Lewis base (as further described above); H is hydrogen; (L-H) is a Bronsted acid (as further described above); $A^-$ is a boron containing non-coordinating anion having the charge $d^-$ (as further described above); d is 1, 2, or 3.

In a preferred embodiment in any NCA's represented by Formula 14 described above, the reducible Lewis acid is represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCA's represented by Formula 14 described above, $Z_d^+$ is represented by the formula: $(L-H)_d^+$, wherein L is a neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

In a preferred embodiment in any of the NCA's represented by Formula 14 described above, the anion component $A^{d-}$ is represented by the formula $[M^{*k^*+}Q^*_{n*}]^{d^*-}$ wherein k* is 1, 2, or 3; n* is 1, 2, 3, 4, 5, or 6 (preferably 1, 2, 3, or 4); n*−k*=d*; M* is boron; and Q* is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q* having up to 20 carbon atoms with the proviso that in not more than 1 occurrence is Q* a halide.

This invention also relates to a method to polymerize olefins comprising contacting olefins (such as ethylene and or propylene) with the catalyst compound and an NCA activator represented by the formula (I):

$$R_nM^{**}(ArNHal)_{4-n} \quad (I)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula I also comprises a suitable cation that is essentially non-interfering with the ionic catalyst complexes formed with the transition metal compounds, preferably the cation is $Z_d^+$ as described above.

In a preferred embodiment in any of the NCA's comprising an anion represented by Formula I described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl groups; $-SR^1$, $-NR_2^2$, and $-PR_2^3$, where each $R^1$, $R^2$, or $R^3$ is independently a substituted or unsubstituted hydrocarbyl as defined above; or a $C_1$ to $C_{30}$ hydrocarbyl substituted organometalloid.

In a preferred embodiment in any of the NCA's comprising an anion represented by Formula I described above, the NCA also comprises cation comprising a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCA's comprising an anion represented by Formula I described above, the NCA also comprises a cation represented by the formula, $(L-H)_d^+$, wherein L is a neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (16):

$$(OX^{e+})_d (A^{d-})_e \quad (16)$$

wherein $OX^{e+}$ is a cationic oxidizing agent having a charge of e+; e is 1, 2, or 3; d is 1, 2 or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, the catalyst compounds can be used with Bulky activators. A "Bulky activator" as used herein refers to anionic activators represented by the formula:

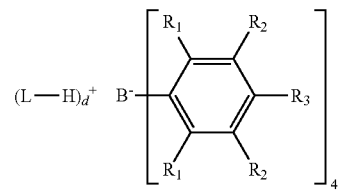

where:
each $R_1$ is, independently, a halide, preferably a fluoride;
each $R_2$ is, independently, a halide, a $C_6$ to $C_{20}$ substituted aromatic hydrocarbyl group or a siloxy group of the formula $-O-Si-R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula $-O-Si-R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is a neutral Lewis base; $(L-H)^+$ is a Bronsted acid; d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV = 8.3 V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å³) | Total MV (Å³) |
|---|---|---|---|---|---|
| Dimethylanilinium tetrakis(perfluoronaphthyl)borate | | $C_{10}F_7$ | 34 | 261 | 1044 |
| Dimethylanilinium tetrakis(perfluorobiphenyl)borate | | $C_{12}F_9$ | 42 | 349 | 1396 |
| [4-tButyl-PhNMe₂H] [(C₆F₃(C₆F₅)₂)₄] | | $C_{18}F_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis (perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

Illustrative, but not limiting, examples of boron compounds which may be used as an activator in the processes of this invention are: N,N-dimethylanilinium tetrakis(perfluorophenyl)borate; methyldioctadecylammonium tetrakis(perfluorophenyl)borate; methyldi(C$_{14-20}$ alkyl)ammonium tetrakis(perfluorophenyl)borate; trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4$$^-$], [Me$_3$NH$^+$][B(C$_6$F$_5$)$_4$$^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium)tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium)tetrakis(3,5-bis(trifluoromethyl) phenyl)borate, di-(i-propyl)ammonium tetrakis (pentafluorophenyl)borate, (where alkyl is methyl, ethyl, propyl, n-butyl, sec-butyl, or t-butyl).

Supports

In some embodiments, the complexes described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be placed on the same support. Likewise, two or more activators or an activator and co-activator may be placed on the same support.

Suitable solid particle supports are typically comprised of polymeric or refractory oxide materials, each being preferably porous. Preferably any support material that has an average particle size greater than 10 µm is suitable for use in this invention. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component, however, an additional activator may also be used.

The support material may be pretreated by any number of methods. For example, inorganic oxides may be calcined, chemically treated with dehydroxylating agents such as aluminum alkyls and the like, or both.

Polymeric carriers will also be suitable in accordance with the invention, see for example the descriptions in WO 95/15815 and U.S. Pat. No. 5,427,991. The methods disclosed may be used with the catalyst complexes, activators or catalyst systems of this invention to adsorb or absorb them on the polymeric supports, particularly if made up of porous particles, or may be chemically bound through functional groups bound to or in the polymer chains.

Useful supports typically have a surface area of from 10-700 $m^2/g$, a pore volume of 0.1-4.0 cc/g and an average particle size of 10-500 µm. Some embodiments select a surface area of 50-500 $m^2/g$, a pore volume of 0.5-3.5 cc/g, or an average particle size of 20-200 µm. Other embodiments select a surface area of 100-400 $m^2/g$, a pore volume of 0.8-3.0 cc/g, and an average particle size of 30-100 µm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex preferably does not exceed the support's pore volume.

Polymerization

Inventive catalyst complexes are useful in polymerizing unsaturated monomers conventionally known to undergo metallocene-catalyzed polymerization such as solution, slurry, gas-phase, and high-pressure polymerization. Typically one or more of the complexes described herein, one or more activators, and one or more monomers are contacted to produce polymer. In certain embodiments, the complexes may be supported and as such will be particularly useful in the known, fixed-bed, moving-bed, fluid-bed, slurry, solution, or bulk operating modes conducted in single, series, or parallel reactors.

One or more reactors in series or in parallel may be used in the present invention. The complexes, activator and when required, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reactor and another component to other reactors. In one preferred embodiment, the complex is activated in the reactor in the presence of olefin.

In a particularly preferred embodiment, the polymerization process is a continuous process.

Polymerization processes used herein typically comprise contacting one or more alkene monomers with the complexes (and, optionally, activator) described herein. For purpose of this invention, alkenes are defined to include multi-alkenes (such as dialkenes) and alkenes having just one double bond. Polymerization may be homogeneous (solution or bulk polymerization) or heterogeneous (slurry-in a liquid diluent, or gas phase-in a gaseous diluent). In the case of heterogeneous slurry or gas phase polymerization, the complex and activator may be supported. Silica is useful as a support herein. Chain transfer agents (such as hydrogen, or diethyl zinc) may be used in the practice of this invention.

The present polymerization processes may be conducted under conditions preferably including a temperature of about 30° C. to about 200° C., preferably from 60° C. to 195° C., preferably from 75° C. to 190° C. The process may be conducted at a pressure of from 0.05 MPa to 1500 MPa. In a preferred embodiment, the pressure is between 1.7 MPa and 30 MPa, or in another embodiment, especially under supercritical conditions, the pressure is between 15 MPa and 1500 MPa.

Polymer Products

While the molecular weight of the polymers produced herein is influenced by reactor conditions including temperature, monomer concentration and pressure, the presence of chain terminating agents and the like, the homopolymer and copolymer products produced by the present process may have an Mw of about 1,000 to about 2,000,000 g/mol, alternately of about 30,000 to about 600,000 g/mol, or alternately of about 100,000 to about 500,000 g/mol, as determined by GPC. Preferred polymers produced here may be homopolymers or copolymers. In a preferred embodiment, the comonomer(s) are present at up to 50 mol %, preferably from 0.01 to 40 mol %, preferably 1 to 30 mol %, preferably from 5 to 20 mol %.

Articles made using polymers produced herein may include, for example, molded articles (such as containers and bottles, e.g., household containers, industrial chemical containers, personal care bottles, medical containers, fuel tanks, and storageware, toys, sheets, pipes, tubing) films, non-wovens, and the like. It should be appreciated that the list of applications above is merely exemplary, and is not intended to be limiting.

Having described the various features of the pyridyldiamide metal catalyst components and their use in olefin polymerization, described herein in numbered embodiments, referring by number to the chemical structures, are:

1. A pyridyldiamide metal catalyst component having the general formula (1) or (2):

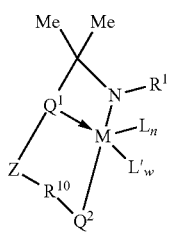

(1)

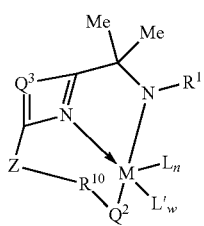

(2)

having the features as described herein.

2. The pyridyldiamide metal catalyst component of numbered embodiment 1, wherein the catalyst component is represented by the formula (3) or (4):

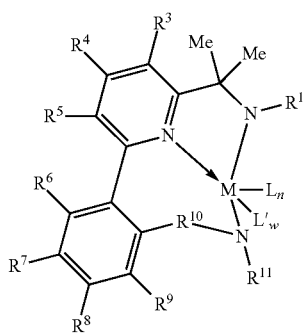

(3)

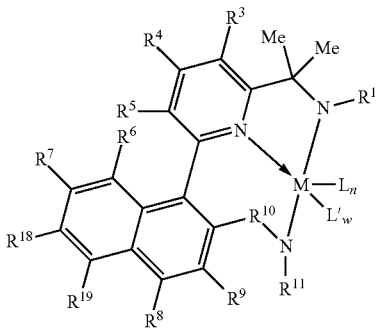

(4)

having the features described herein.

3. The pyridyldiamide metal catalyst component of numbered embodiments 1 or 2, wherein $R^{10}$ is selected from $C_1$ to $C_4$ divalent hydrocarbyls, most preferably a $C_1$ or $C_2$ alkylene.

4. The pyridyldiamide metal catalyst component of any one of the previous numbered embodiments, wherein $R^1$ is selected from phenyl and substituted phenyl, wherein the substitutions are selected from $C_1$ to $C_5$ hydrocarbyls, preferably $C_2$ to $C_4$ hydrocarbyls, and can reside in any of the ortho, meta, para positions on the phenyl ring.

5. The pyridyldiamide metal catalyst component of any one of the previous numbered embodiments, wherein $R^{11}$ is selected from phenyl and substituted phenyl, wherein the substitutions are selected from $C_1$ to $C_5$ hydrocarbyls, preferably $C_1$ hydrocarbyls, and can reside in any of the ortho, meta, para positions on the phenyl ring.

6. The pyridyldiamide metal catalyst component of any one of the previous numbered embodiments, wherein M is hafnium or zirconium, preferably hafnium.

7. A process to produce olefins comprising combining the pyridyldiamide metal catalyst component of any one of the previous numbered embodiments with any one or combination of ethylene and $C_3$ to $C_{12}$ olefins at a temperature from 60 or 65° C. to 120 or 140° C.

8. A pyridyldiamide metal catalyst component having the general formula (5) or (6):

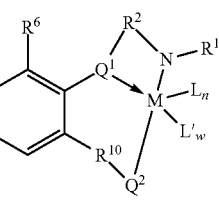

(5)

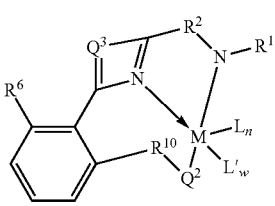

(6)

having the features described herein.

9. The pyridyldiamide metal catalyst component of numbered embodiment 8, wherein the catalyst component is represented by the formula (7):

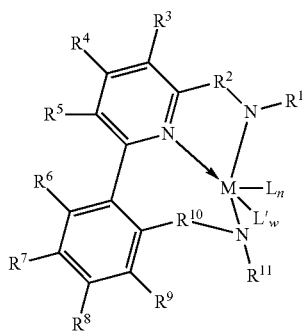

(7)

having the features described herein.
10. The pyridyldiamide metal catalyst component of numbered embodiments 8 or 9, wherein $R^{10}$ is selected from $C_1$ to $C_4$ divalent hydrocarbyl radicals.
11. The pyridyldiamide metal catalyst component of any one of numbered embodiments 8-10, wherein $R^1$ is selected from phenyl and substituted phenyl, wherein the substitutions are selected from $C_1$ to $C_5$ hydrocarbyls, preferably $C_2$ to $C_4$ hydrocarbyls, and can reside in any of the ortho, meta, para positions on the phenyl ring.
12. The pyridyldiamide metal catalyst component of any one of numbered embodiments 8-11, wherein $R^{11}$ is selected from phenyl and substituted phenyl, wherein the substitutions are selected from $C_1$ to $C_5$ hydrocarbyls, preferably methyl, and can reside in any of the ortho, meta, para positions on the phenyl ring.
13. The pyridyldiamide metal catalyst component of any one of numbered embodiments 8-12, wherein $R^6$ is selected from methyl, ethyl, propyl, isopropyl, butyl, sec-butyl, and tert-butyl; preferably methyl; or alternatively, in numbered embodiment 10, $R^6$ and $R^7$ are hydrocarbyls that are joined together to form an aryl ring.
14. The pyridyldiamide metal catalyst component of any one of numbered embodiments 8-13, wherein M is hafnium or zirconium, preferably hafnium.
15. A process to produce polyolefins comprising combining the pyridyldiamide metal catalyst component of any one of numbered embodiments 8-14 with any one or combination of ethylene and $C_3$ to $C_{12}$ olefins at a temperature from 60 or 65 or 70 or 75 or 80 or 85° C. to 120 or 140° C.
16. A process to produce polyolefins comprising combining the pyridyldiamide metal catalyst component of any one of numbered embodiments 8-15 wherein the polyolefin (preferably polypropylene) has a molecular weight distribution (Mw/Mn) of less than 2.5 or 2.2 or 2.0; or within the range of from 1.0 or 1.2 or 1.4 to 2.0 or 2.2. or 2.5.
17. A process to produce polyolefins comprising combining the pyridyldiamide metal catalyst component of any one of numbered embodiments 8-16 wherein $R^{2'}$ and $R^{2''}$ are each methyl and the activity of the catalyst component is greater than 20,000 or 25,000 g polymer/mmol catalyst/hour, or within the range of from 20,000 or 25,000 or 50,000 g polymer/mmol catalyst/hour to 300,000 or 400,000 or 500,000 g polymer/mmol catalyst/hour.
18. A process to produce polyolefins, preferably polypropylene, comprising combining the pyridyldiamide metal catalyst component of any one of numbered embodiments 8-17 wherein the lower reaction temperature range is within the range of from 70 to 90° C. and the upper reaction temperature range is within the range of from 100 to 110° C. and the melting point temperature of the ethylene copolymer increases by at least 5 or 10° C.
19. The use of the pyridyldiamide metal catalyst component (1), (2), (5), or (6) to polymerize ethylene or propylene alone or with any one or more $C_4$ to $C_{12}$ olefins to produce ethylene or propylene homopolymers and copolymers.

The various descriptive elements and numerical ranges disclosed herein for the process, the catalyst component, and the copolymers can be combined with other descriptive elements and numerical ranges to describe the invention(s); further, for a given element, any upper numerical limit can be combined with any lower numerical limit described herein. The features of the invention are described in the following non-limiting examples.

EXAMPLES

Pyridyldiamide Catalyst Component

The following is a description of the inventive and "comparative" catalyst components, shown in FIG. 1. The ligands are called "$L^1$-$H_2$", etc., while the catalyst components (metal-ligand complexes) are called "$L^1HfMe_2$", etc. Complexes $L^7HfMe_2$ and $L^9HfMe_2$ are used to demonstrate the usefulness of the intermediately substituted "$R^6$" group demonstrated herein.

4,4,5,5-Tetramethyl-2-(2-methyl-1-naphthyl)-1,3,2-dioxaborolane

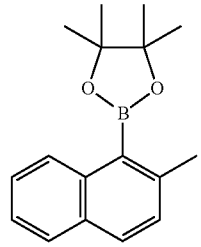 [SMILES: Cc1ccc2ccccc2c1B1OC(C)(C)C(C)(C)O1]

1.2-Dibromoethane (~0.3 ml) was added to 6.10 g (250 mmol) magnesium turnings in 1000 cm³ of THF. This mixture was stirred for 10 min, and then 55.3 g (250 mmol) of 1-bromo-2-methylnaphtalene was added for 1 h by vigorous stirring at room temperature for 3.5 h. Further on, 46.5 g (250 mmol) of 2-isopropoxy-4,4,5,5-tetramethyl-1,3,2-dioxaborolane was added in one portion. The resulting mixture was stirred for 15 min and then was poured into 1000 cm³ of cold water. The product was extracted with 3×300 ml of ethyl acetate. The organic layer was separated, washed by water, brine, then dried over $MgSO_4$, and, finally, evaporated to dryness. The resulting white solid was washed by 2×75 ml of pentane and dried in a vacuum. Yield 47.3 g (70%). Anal. calc. for $C_{17}H_{21}BO_2$: C, 76.14; H, 7.89. Found: C, 76.31; H, 8.02. ¹H NMR (CDCl₃): δ 8.12 (m, 1H, 8-H), 7.77 (m, 1H, 5-H), 7.75 (d, J=8.4 Hz, 1H, 4-H), 7.44 (m, 1H, 7-H), 7.38 (m, 1H, 6-H), 7.28 (d, J=8.4 Hz, 1H, 3-H), 2.63 (s, 3H, 2-Me), 1.48 (s, 12H, $CMe_2CMe_2$).

2-[2-(Bromomethyl)-1-naphthyl]-4,4,5,5-tetramethyl-1,3,2-dioxaborolane

A mixture of 47.3 g (176 mmol) of 4,4,5,5-tetramethyl-2-(2-methyl-1-naphthyl)-1,3,2-dioxaborolane, 33.0 g (185 mmol) of NBS and 0.17 g of benzoyl peroxide in 340 ml of $CCl_4$ was stirred at 75° C. for 14 h. Further on, the reaction mixture was cooled to room temperature, filtered through glass frit (G3), and the filtrate was evaporated to dryness. This procedure gave 62.2 g (99%) of beige solid. Anal. calc. for $C_{17}H_{20}BBrO_2$: C, 58.83; H, 5.81. Found: C, 59.00; H, 5.95. $^1H$ NMR (CDCl$_3$): δ 8.30 (m, 1H, 8-H), 7.84 (d, J=8.3 Hz, 1H, 4-H), 7.79 (m, 1H, 5-H), 7.43-7.52 (m, 3H, 3, 6, 7-H), 4.96 (s, 2H, CH$_2$Br), 1.51 (s, 12H, CMe$_2$CMe$_2$).

N-{[1-(4,4,5,5-Tetramethyl-1,3,2-dioxaborolan-2-yl)-2-naphthyl]methyl}-aniline A mixture of 12.0 g (129 mmol) of aniline, 30.0 g (86.5 mmol) of 2-[2-(bromomethyl)-1-naphthyl]-4,4,5,5-tetramethyl-1,3,2-dioxaborolane, and 13.1 g (94.9 mmol) of K$_2$CO$_3$ in 500 cm$^3$ of DMF was stirred for 12 h at 80° C. The resulting mixture was poured into 1000 cm$^3$ of water. The product was extracted with 3×200 ml of ethyl acetate. The combined extract was dried over MgSO$_4$ and then evaporated to dryness. An excess of aniline was distilled off using Kugelrohr apparatus. Yield 25.3 g (82%). Anal. calc. for $C_{23}H_{26}BNO_2$: C, 76.89; H, 7.29; N, 3.90. Found: C, 77.02; H, 7.45; N, 3.70. $^1$H NMR (CDCl$_3$): δ 8.19 (m, 1H, 8-H in naphthalene), 7.83 (d, J=8.8 Hz, 1H, 4-H in naphthalene), 7.80 (m, 1H, 5-H in naphthalene), 7.49 (d, J=8.8 Hz, 1H, 3-H in naphthalene), 7.40-7.51 (m, 2H, 6, 7-H in naphthalene), 7.19 (m, 2H, 2, 6-H in Ph), 6.75 (m, 1H, 4-H in Ph), 6.69 (m, 2H, 3, 5-H in Ph), 4.51 (s, 2H, CH$_2$N), 4.07 (br.s, 1H, NH), 1.38 (s, 12H, Me in tetramethyldioxaborolane).

2,4,6-Trimethyl-N-{[1-(4,4,5,5-tetramethyl-1,3,2-dioxaborolan-2-yl)-2-naphthyl]methyl}aniline A mixture of 29.2 g (216 mmol) of 2,4,6-trimethylaniline, 50.0 g (144 mmol) of 2-[2-(bromomethyl)-1-naphthyl]-4,4,5,5-tetramethyl-1,3,2-dioxaborolane, and 22.0 g (159 mmol) of K$_2$CO$_3$ in 1100 cm$^3$ of DMF was stirred for 12 h at 80° C. The resulting mixture was poured into 2000 cm$^3$ of water. The product was extracted with 3×400 ml of ethyl acetate. The combined extract was dried over MgSO$_4$ and then evaporated to dryness. The product was isolated by flash chromatography on silica gel 60 (40-63 um; eluent: dichloromethane). Yield 45.0 g (78%). Anal. calc. for $C_{26}H_{32}BNO_2$: C, 77.81; H, 8.04; N, 3.49. Found: C, 78.00; H, 8.24; N, 3.26. $^1$H NMR (CDCl$_3$): δ 8.27 (m, 1H, 8-H in naphthyl), 7.84 (m, 1H, 5-H in naphthyl), 7.81 (d, J=8.3 Hz, 1H, 4-H in naphthyl), 7.54 (m, 1H, 7-H in naphthyl), 7.48 (m, 1H, 6-H in naphthyl), 7.37 (d, J=8.3 Hz, 1H, 3-H in naphthyl), 6.87 (s, 2H, 3, 5-H in mesityl), 4.39 (s, 2H, CH$_2$N), 3.68 (br.s, 1H, NH), 2.31 (s, 6H, 2, 6-Me in mesityl), 2.30 (s, 3H, 4-Me in mesityl), 1.49 (s, 12H, Me in tetramethyldioxaborolane).

N-[1-(6-Bromopyridin-2-yl)ethylidene]-2,6-diethylaniline

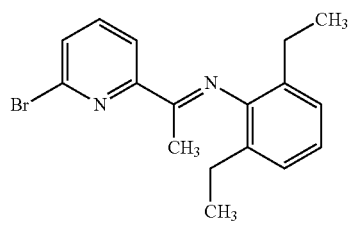 [SMILES: CCc1cccc(CC)c1/N=C(\C)c1cccc(Br)n1]

In argon atmosphere, a mixture of 6.00 g (30.0 mmol) of 1-(6-bromopyridin-2-yl)ethanone, 4.69 g (31.5 mmol) of 2,6-diethylaniline, 50 mg of TsOH, and 300 ml of toluene was refluxed for 2-3 h using a Soxhlet apparatus with an extraction thimble filled with anhydrous CaCl$_2$. The reaction mixture was cooled to ambient temperature, passed through a short layer of silica gel 60 (40-63 um), and then evaporated to dryness. The crude product was recrystallized from 50 ml of methanol. Yield 6.20 g (63%) of a yellow crystalline solid. Anal. calc. for $C_{17}H_{19}BrN_2$: C, 61.64; H, 5.78, N, 8.46. Found: C, 61.83; H, 5.88, N, 8.39. $^1$H NMR (CDCl$_3$): δ 8.32 (dd, J=7.8 Hz, J=0.7 Hz, 1H, 3-H in pyridine), 7.65 (t, J=7.8 Hz, 1H, 4-H in pyridine), 7.57 (dd, J=7.8 Hz, J=0.7 Hz, 1H, 5-H in pyridine), 7.09-7.11 (m, 2H, 3, 5-H in 2, 6-Et$_2$C$_6$H$_3$), 7.02 (m, 1H, 4-H in 2, 6-Et$_2$C$_6$H$_3$), 2.33 (m, 4H, CH$_2$Me), 2.16 (s, 3H, CH$_3$C=N), 1.11 (t, J=7.6 Hz, 6H, CH$_2$Me).

N-[1-(6-Bromopyridin-2-yl)-1-methylethyl]-2,6-diethylaniline

In argon atmosphere, to a mixture of 6.20 g (18.7 mmol) of N-[1-(6-bromopyridin-2-yl)ethylidene]-2,6-diethylaniline in 110 ml of dry toluene cooled to 0° C., a solution of 2.70 g (37.4 mmol) of AlMe$_3$ in 40 ml of dry toluene was added dropwise for 10 min. The reaction mixture was slowly warmed to room temperature, stirred for 25 min at 40° C., and then cooled to 0° C. Further on, 150 ml of 5% KOH was added dropwise by vigorous stirring for 1 h at this temperature. The aqueous layer was separated, the organic layer was washed with 100 ml of water, 100 ml of brine, dried over Na$_2$SO$_4$, and then evaporated to dryness. Yield 6.40 g (98%) of yellow oil. Anal. Calc. for $C_{18}H_{23}BrN_2$: C, 62.25; H, 6.68, N, 8.07. Found: C, 62.40; H, 6.82, N, 8.04. $^1$H NMR (CDCl$_3$): δ 7.61 (dd, J=7.5 Hz, J=0.6 Hz, 1H, 5-H in pyridine), 7.51 (t, J=7.5 Hz, 1H, 4-H in pyridine), 7.34 (dd, J=7.5 Hz, J=0.6 Hz, 1H, 3-H in pyridine), 6.97-7.03 (m, 3H, 3, 4, 5-H in 2, 6-Et$_2$C$_6$H$_3$), 3.97 (br.s, 1H, NH), 2.45 (q, J=7.5 Hz, 4H, CH$_2$Me), 1.46 (s, 6H, Me$_2$C), 1.11 (t, J=7.5 Hz, 6H, CH$_2$Me).

N-(1-{6-[2-(Anilinomethyl)-1-naphthyl]pyridin-2-yl}-1-methylethyl)-2,6-diethylaniline (L$^1$H$_2$)

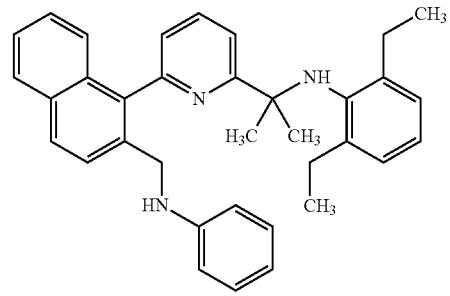 [SMILES: CCc1cccc(CC)c1NC(C)(C)c1cccc(-c2c(CNc3ccccc3)ccc3ccccc23)n1]

A mixture of 2.17 g (6.00 mmol) of N-{[1-(4,4,5,5-tetramethyl-1,3,2-dioxaborolan-2-yl)-2-naphthyl]methyl}-aniline, 4.33 g (6.00 mmol) of N-[1-(6-bromopyridin-2-yl)-1-methylethyl]-2,6-diethylaniline and 1.60 g (15.10 mmol) of Na$_2$CO$_3$×10H$_2$O, 65 ml of water, 18 ml of methanol and 80 ml of toluene was purged with argon for 30 min. To this solution 0.35 g (0.30 mmol) of Pd(PPh$_3$)$_4$ was added. This mixture was stirred for 12 h at 80° C., then cooled to room temperature. The organic layer was separated, the aqueous layer was extracted with 3×200 ml of ethyl acetate. The combined organic extract was washed with brine, dried over Na$_2$SO$_4$ and evaporated to dryness. The crude product was purified by flash chromatography on silica gel 60 (40-63 um, eluent: dichloromethane-ethyl acetate=20:1, vol.). Yield 2.35 g (76%) of yellow oil. Anal. calc. for $C_{35}H_{37}N_3$: C, 84.13; H, 7.46; N, 8.41. Found: C, 84.34; H, 7.55; N, 8.35. $^1$H NMR (CDCl$_3$): δ 7.87-7.90 (m, 2H, 4, 8-H in naphtalene), 7.81 (t, J=7.8 Hz, 1H, 4-H in pyridine), 7.70 (dd, J=7.8 Hz, J=0.6 Hz, 1H, 5-H in pyridine), 7.67 (d, J=8.6 Hz, 1H, 3-H in naphtalene), 7.45-7.49 (m, 2H, 5, 7-H in naphtalene), 7.38-7.42 (m, 1H, 6-H in naphtalene), 7.31 (dd, J=7.8 Hz, J=0.6 Hz, 1H, 3-H in pyridine), 7.10 (m, 2H, 3, 5-H in Ph), 6.93-7.00 (m, 3H, 3, 4, 5-H in 2, 6-Et$_2$C$_6$H$_3$), 6.66 (m, 1H, 4-H in Ph), 6.58 (m, 2H, 2, 6-H in Ph), 4.12-4.28 (m, 4H, CH$_2$NH and NHCMe$_2$), 2.44 (q, J=7.6 Hz, 4H, CH$_2$Me), 2.43 (q, J=7.6 Hz, 4H, CH$_2$Me), 1.54 (s, 3H, CMeMe'), 1.44 (s, 3H, CMeMe'), 1.02 (t, J=7.6 Hz, 6H, CH$_2$Me).

Synthesis of ligand for MPN3-L$_2$

N-[1-(6-Bromopyridin-2-yl)ethylidene]-2,6-diisopropylaniline

In argon atmosphere, a mixture of 3.70 g (18.50 mmol) of 1-(6-bromopyridin-2-yl)ethanone, 3.27 g (18.50 mmol) of 2,6-diisopropylaniline, 50 mg of TsOH, and 150 ml of toluene was refluxed for 2-3 h using a Soxhlet apparatus with an extraction thimble filled with anhydrous CaCl$_2$. The reaction mixture was cooled to ambient temperature, passed through a short layer of silica gel 60 (40-63 um), and then evaporated to dryness. The crude product was recrystallized from 30 ml of methanol. Yield 3.63 g (56%) of yellow crystalline solid. Anal. calc. for $C_{19}H_{23}BrN_2$: C, 63.51; H, 6.45, N, 7.80. Found: C, 63.44; H, 6.40, N, 7.93. $^1$H NMR (CDCl$_3$): δ 8.31 (dd, J=7.7 Hz, J=0.6 Hz, 1H, 3-H in pyridine), 7.66 (t, J=7.7 Hz, 1H, 4-H in pyridine), 7.57 (dd, J=7.7 Hz, J=0.6 Hz, 1H, 5-H in pyridine), 7.14-7.16 (m, 2H, 3, 5-H in 2, 6-$^i$Pr$_2$C$_6$H$_3$), 7.08 (m, 1H, 4-H in 2, 6-$^i$Pr$_2$C$_6$H$_3$), 2.68 (sep, J=6.7 Hz, 2H, CHMe$_2$), 2.17 (s, 3H, MeC=N), 1.13 (d, J=6.7 Hz, 6H, CHMe$_2$), 1.12 (d, J=6.7 Hz, 6H, CHMe$_2$).

N-[1-(6-Bromopyridin-2-yl)-1-methylethyl]-2,6-diisopropylaniline

In argon atmosphere, to a solution of 3.61 g (10.0 mmol) of N-[(1E)-1-(6-bromopyridin-2-yl)ethylidene]-2,6-diisopropylaniline in 80 ml of dry toluene cooled to 0° C. a solution of 1.44 g (20.0 mmol) of AlMe$_3$ in 20 ml of dry toluene was added dropwise by vigorous stirring for ten minutes. The resulting mixture was slowly warmed to room temperature, stirred for 25 min at 40° C., cooled to 0° C., and then 80 ml of 5% KOH was added dropwise for 1 h at this temperature. The aqueous layer was separated, the organic layer was washed with 80 ml of water, 80 ml of brine, dried over Na$_2$SO$_4$, and then evaporated to dryness. Yield 3.52 g (94%) of yellowish crystalline solid. Anal. calc. for $C_{20}H_{27}BrN_2$: C, 64.00; H, 7.25, N, 7.46. Found: C, 64.11; H, 7.19; N, 7.40. $^1$H NMR (CDCl$_3$): δ 7.48-7.54 (m, 2H, 4, 5-H in pyridine), 7.34 (dd, J=6.9 Hz, J=1.6 Hz, 1H, 3-H in pyridine), 7.04-7.08 (m, 3H, 3, 4, 5-H in 2, 6-$^i$Pr$_2$C$_6$H$_3$), 3.98 (br.s, 1H, NH), 3.15 (sep, J=6.9 Hz, 2H, CHMe$_2$), 1.44 (s, 6H, Me$_2$C), 7.08 (d, J=6.9 Hz, 12H, CHMe$_2$).

N-(1-{6-[2-(Anilinomethyl)-1-naphthyl]pyridin-2-yl}-1-methylethyl)-2,6-diisopropylaniline (L$^2$H$_2$)

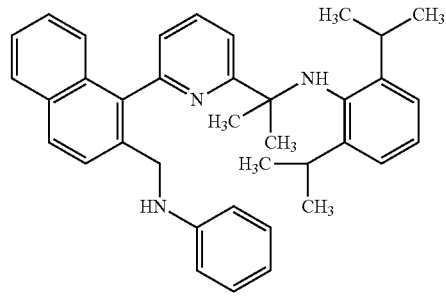 [SMILES: CC(C)c1cccc(C(C)C)c1NC(C)(C)c1cccc(-c2c(CNc3ccccc3)ccc3ccccc23)n1]

A mixture of 2.02 g (5.64 mmol) of N-{[1-(4,4,5,5-Tetramethyl-1,3,2-dioxaborolan-2-yl)-2-naphthyl]methyl}-aniline, 2.11 g (5.64 mmol) of N-[1-(6-bromopyridin-2-yl)-1-methylethyl]-2,6-diisopropylaniline, 4.03 g (14.10 mmol) of Na$_2$CO$_3$×10H$_2$O, 63 ml of water, 18 ml of methanol, and 76 ml of toluene was purged with argon for 30 min. To the obtained solution 0.32 g (0.28 mmol) of Pd(PPh$_3$)$_4$ was added. In argon atmosphere, this mixture was stirred for 12 h at 80° C. Then, it was cooled to room temperature, the organic layer was separated, the aqueous layer was extracted with 3×200 ml of ethyl acetate. The combined organic extract was washed with brine, dried over Na$_2$SO$_4$ and evaporated to dryness. The crude product was purified by flash chromatography on silica gel 60 (40-63 um, eluent: dichloromethane-ethyl acetate=20:1, vol.). Yield 1.56 g (52%) of yellow oil. Anal. calc. for $C_{37}H_{41}N_3$: C, 84.21; H, 7.83; N, 7.96. Found: C, 84.37; H, 7.95; N, 7.84. $^1$H NMR (CDCl$_3$): δ 7.89 (d, J=8.4 Hz, 1H, 4-H in naphtalene), 7.88 (m, 1H, 8-H in naphthalene), 7.82 (t, J=7.8 Hz, 1H, 4-H in pyridine), 7.67 (d, J=8.4 Hz, 1H, 3-H in naphtalene), 7.63 (dd, J=7.8 Hz, J=0.8 Hz, 1H, 5-H in pyridine), 7.44-7.49 (m, 2H, 5, 7-H in naphtalene), 7.37-7.41 (m, 1H, 6-H in naphtalene), 7.31 (dd, J=7.8 Hz, J=0.8 Hz, 1H, 3-H in pyridine), 7.11 (m, 2H, 3, 5-H in Ph), 7.02-7.06 (m, 3H, 3, 4, 5-H in 2, 6-$^i$Pr$_2$C$_6$H$_3$), 6.65 (m, 1H, 4-H in Ph), 6.60 (m, 2H, 2.6-H in Ph), 4.17-4.27 (m, 4H, CH$_2$NH and NHCMe$_2$), 3.20 (sep, J=6.8 Hz, 2H, CHMe$_2$), 1.54 (s, 3H, CMeMe'), 1.40 (s, 3H, CMeMe'), 1.02 (t, J=6.8 Hz, 12H, CHMe$_2$).

N-[1-(6-Bromopyridin-2-yl)ethylidene]-2,4,6-trimethylaniline

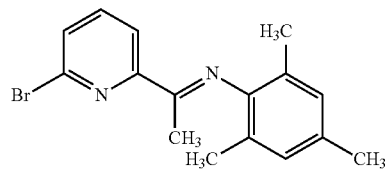

In argon atmosphere, a mixture of 3.70 g (18.50 mmol) of 1-(6-bromopyridin-2-yl)ethanone, 2.49 g (18.50 mmol) of 2,4,6-trimethylaniline, 50 mg of TsOH, and 150 ml of toluene was refluxed for 2.5 h using a Soxhlet apparatus with an extraction thimble filled with anhydrous CaCl$_2$. The resulting mixture was cooled to ambient temperature, passed through a short layer of silica gel 60 (40-63 um), and then evaporated to dryness. Yield 5.59 g (95%) of dark-red solid. Anal. calc. for $C_{16}H_{17}BrN_2$: C, 60.58; H, 5.40; N, 8.83. Found: C, 60.70; H, 5.56; N, 8.77. $^1$H NMR (CDCl$_3$): δ 7.98 (dd, J=7.1 Hz, J=1.4 Hz, 1H, 3-H in pyridine), 7.63-7.71 (m, 2H, 4, 5-H in pyridine), 6.76 (s, 2H, 3, 5-H in mesityl), 2.70 (s, 3H, MeC=N), 2.20 (s, 3H, 4-Me in mesityl), 2.15 (s, 6H, 2, 6-Me in mesityl).

N-[1-(6-Bromopyridin-2-yl)-1-methylethyl]-2,4,6-trimethylaniline

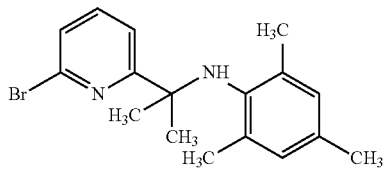

In argon atmosphere, to a solution of 5.59 g (17.61 mmol) of N-[(1E)-1-(6-bromopyridin-2-yl)ethylidene]-2,4,6-trimethylaniline in 140 ml of dry toluene cooled to 0° C., a solution of 2.53 g (35.2 mmol) AlMe$_3$ in 20 ml of dry toluene was added dropwise for 10 min. This mixture was slowly warmed to room temperature, stirred for 25 min at 40° C., cooled to 0° C., and then 140 ml of 5% KOH was added dropwise for 1 h. The aqueous layer was separated, the organic layer was washed with 100 ml of water, then 100 ml of brine, dried over Na$_2$SO$_4$, and then evaporated to dryness. The crude product was purified by flash chromatography on silica gel 60 (40-63 um, eluent: dichloromethane-ethyl acetate=20:1, vol.). Yield 2.80 g (47%) of yellow crystalline solid. Anal. calc. for $C_{17}H_{21}BrN_2$: C, 61.27; H, 6.35; N, 8.41. Found: C, 61.14; H, 6.26; N, 8.31. $^1$H NMR (CDCl$_3$): δ 7.63 (dd, J=8.0 Hz, J=0.6 Hz, $^1$H, 5-H in pyridine), 7.49 (t, J=7.6 Hz, $^1$H, 4-H in pyridine), 7.32 (dd, J=8.0 Hz, J=0.6 Hz, $^1$H, 3-H in pyridine), 6.78 (s, 2H, 3, 5-H in mesityl), 3.65 (br.s, $^1$H, NH), 2.21 (s, 3H, 4-Me in mesityl), 2.01 (s, 6H, 2, 6-Me in mesityl), 1.46 (s, 6H, CMe$_2$).

N-[(1-{6-[1-(Mesitylamino)-1-methylethyl]pyridin-2-yl}-2-naphthyl)methyl]-2,4,6-trimethylaniline (L$^3$H$_2$)

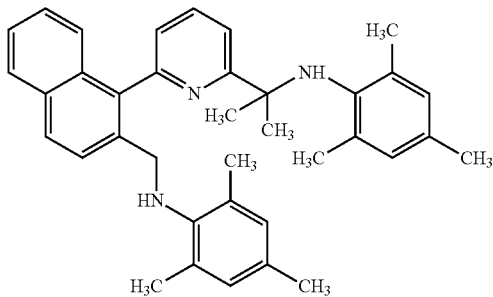 [SMILES: Cc1cc(C)c(NCc2ccc3ccccc3c2-c2cccc(C(C)(C)Nc3c(C)cc(C)cc3C)n2)c(C)c1]

A mixture of 1.70 g (4.20 mmol) of 2,4,6-trimethyl-N-{[1-(4,4,5,5-tetramethyl-1,3,2-dioxaborolan-2-yl)-2-naphthyl]methyl}aniline, 1.40 g (4.20 mmol) of N-[1-(6-bromopyridin-2-yl)-1-methylethyl]-2,4,6-trimethylaniline, 3.00 g (10.50 mmol) of Na$_2$CO$_3$×10H$_2$O, 48 ml of water, 13 ml of methanol, and 56 ml of toluene was purged with argon for 30 min. To this solution 0.24 g (0.21 mmol) of Pd(PPh$_3$)$_4$ was added. The resulting mixture was stirred for 12 h at 80° C. and then cooled to room temperature. The organic layer was separated, the aqueous layer was extracted with 3×200 ml of ethyl acetate. The combined organic extract was washed with brine, dried over Na$_2$SO$_4$ and evaporated to dryness. The crude product was purified by flash chromatography on silica gel 60 (40-63 um, eluent: dichloromethane-ethyl acetate=20:1, vol.). Yield 1.25 g (56%) of yellow oil. Anal. calc. for $C_{37}H_{41}N_3$: C, 84.21; H, 7.83; N, 7.96. Found: C, 84.38; H, 7.69; N, 8.02. $^1$H NMR (CDCl$_3$): δ 7.90 (m, 1H, 8-H in naphthalene), 7.86 (d, J=8.4 Hz, 1H, 4-H in naphthalene), 7.77-7.82 (m, 2H, 4, 5-H in pyridine), 7.37-7.50 (m, 4H, 3, 5, 6, 7-H in naphthalene), 7.23 (dd, J=6.1 Hz, J=2.3 Hz, 1H, 3-H in pyridine), 6.79 (s, 2H, 3, 5-H in mesityl), 6.78 (s, 2H, 3, 5-H in mesityl), 3.99 (m, 2H, CH$_2$N), 3.66 (br.s, 2H, NH), 2.24 (s, 3H, 4-Me in mesityl), 2.23 (s, 3H, 4-Me in mesityl), 2.06 (s, 6H, 2, 6-Me in mesityl), 2.05 (s, 6H, 2, 6-Me in mesityl), 1.57 (s, 3H, CMeMe'), 1.54 (s, 3H, CMeMe').

N-{[1-(6-{1-[(2,6-Diethylphenyl)amino]-1-methylethyl}pyridin-2-yl)-2-naphthyl]methyl}-2,4,6-trimethylaniline (L$^4$H$_2$)

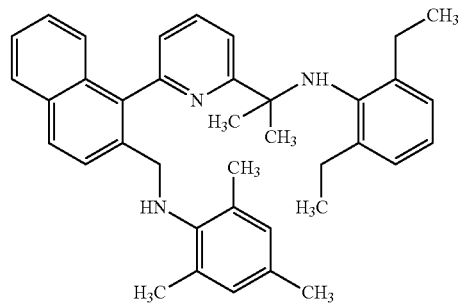 [SMILES: CCc1cccc(CC)c1NC(C)(C)c1cccc(-c2c(CNc3c(C)cc(C)cc3C)ccc3ccccc23)n1]

A mixture of 2.43 g (6.00 mmol) of 2,4,6-trimethyl-N-{[1-(4,4,5,5-tetramethyl-1,3,2-dioxaborolan-2-yl)-2-naphthyl]methyl}aniline, 2.10 g (6.00 mmol) of N-[1-(6-bromopyridin-2-yl)-1-methylethyl]-2,6-diethylaniline, 4.33 g (15.10 mmol) of Na$_2$CO$_3$×10H$_2$O, 65 ml of water, 18 ml of methanol, and 80 ml of toluene was purged with argon for 30 min. To this solution 0.35 g (0.30 mmol) of Pd(PPh$_3$)$_4$ was added. In argon atmosphere, this mixture was stirred for 12 h at 80° C. Then, it was cooled to room temperature, the organic layer was separated, the aqueous layer was extracted with 3×200 ml of ethyl acetate. The combined organic extract was washed with brine, dried over Na$_2$SO$_4$ and evaporated to dryness. The crude product was purified by flash chromatography on silica gel 60 (40-63 um, eluent: dichloromethane-ethyl acetate=20:1, vol.). Yield 2.66 g (82%) of yellow oil. Anal. calc. for $C_{39}H_{43}N_3$: C, 84.24; H, 8.00; N, 7.76. Found: C, 84.36; H, 8.15; N, 7.61. $^1$H NMR (CDCl$_3$): δ 7.87 (m, 1H. 8-H in naphthalene), 7.82 (d, J=8.4 Hz, 1H, 4-H in naphthalene), 7.78 (t, J=7.7 Hz, 1H, 4-H in pyridine), 7.70 (dd, J=7.7 Hz, J=0.6 Hz, 1H, 5-H in pyridine), 7.35-7.47 (m, 4H, 3, 5, 6, 7-H in naphthalene), 7.21 (dd, J=7.7 Hz, J=0.6 Hz, 1H, 3-H in pyridine), 6.93-7.00 (m, 3H, 3, 4, 5-H in 2, 6-Et$_2$C$_6$H$_3$), 6.74 (s, 2H, 3, 5-H in mesityl), 3.96 (m, 2H, CH$_2$N), 3.70 (br.s, 2H, NH), 2.47 (sep, J=7.6 Hz, 1H, CHMe$_2$), 2.43 (sep, J=7.6 Hz, 1H, CHMe$_2$), 2.21 (s, 3H, 4-Me in mesityl), 2.03 (s, 6H, 2, 6-Me in mesityl), 1.54 (s, 3H, CMeMe'), 1.47 (s, 3H, CMeMe'), 1.02 (t, J=7.6 Hz, 6H, CHMe$_2$).

N-{[1-(6-{1-[(2,6-Diisopropylphenyl)amino]-1-methylethyl}pyridin-2-yl)-2-naphthyl]methyl}-2,4,6-trimethylaniline (L⁵H₂)

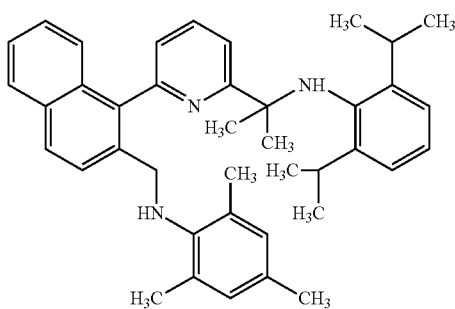 [SMILES: Cc1cc(C)c(NCc2ccc3ccccc3c2-c2cccc(C(C)(C)Nc3c(C(C)C)cccc3C(C)C)n2)c(C)c1]

A mixture of 2.26 g (5.64 mmol) of 2,4,6-trimethyl-N-{[1-(4,4,5,5-tetramethyl-1,3,2-dioxaborolan-2-yl)-2-naphthyl]methyl}aniline, 2.11 g (6.00 mmol) of N-[1-(6-bromopyridin-2-yl)-1-methylethyl]-2,6-diisopropylaniline, 4.03 g (14.1 mmol) of $Na_2CO_3 \times 10H_2O$, 63 ml of water, 18 ml of methanol, and 76 ml of toluene was purged with argon for 30 min. To the obtained solution 0.32 g (0.30 mmol) of $Pd(PPh_3)_4$ was added. In argon atmosphere, this mixture was stirred for 12 h at 80° C., then cooled to room temperature. The organic layer was separated, the aqueous layer was extracted with 3×200 ml of ethyl acetate. The combined organic extract was washed with brine, dried over $Na_2SO_4$ and evaporated to dryness. The crude product was purified by flash chromatography on silica gel 60 (40-63 um, eluent: dichloromethane-ethyl acetate=20:1, vol.). Yield 2.60 g (81%) of yellow oil. Anal. calc. for $C_{40}H_{47}N_3$: C, 84.31; H, 8.31; N, 7.37. Found: C, 84.50; H, 8.51; N, 7.22. $^1$H NMR ($CDCl_3$): δ 7.88 (m, 1H, 8-H in naphtalene), 7.85 (d, J=8.4 Hz, 1H, 4-H in naphtalene), 7.80 (t, J=7.7 Hz, 1H, 4-H in pyridine), 7.67 (dd, J=7.7 Hz, J=0.6 Hz, 1H, 5-H in naphtalene), 7.37-7.49 (m, 4H, 3, 5, 6, 7-H in naphtalene), 7.24 (dd, J=7.7 Hz, J=0.6 Hz, 1H, 3-H in pyridine), 7.04-7.06 (m, 3H, 3, 4, 5-H in 2, 6-$^i$Pr₂C₆H₃), 6.76 (s, 2H, 3, 5-H in mesityl), 4.14 (br.s, 1H, NH), 4.00 (m, 2H, CH₂N), 3.48 (br.s, 1H, NH), 3.23 (sep, J=6.7 Hz, 2H, CHMe₂), 2.22 (s, 3H, 4-Me in mesityl), 2.06 (s, 6H, 2, 6-Me in mesityl), 1.57 (s, 3H, CMeMe'), 1.45 (s, 3H, CMeMe'), 1.04 (d, J=6.7 Hz, 6H, CHMe₂), 1.02 (d, J=6.7 Hz, 6H, CHMe₂).

N-[(6-Bromopyridin-2-yl)methyl]-2,6-diisopropylaniline (3)

A solution of 85.0 g (457 mmol) of 6-bromopyridine-2-carbaldehyde and 80.9 g (457 mmol) of 2,6-diisopropylaniline in 1000 ml of ethanol was refluxed for 8 h. The obtained solution was evaporated to dryness, and the residue was re-crystallized from 200 ml of methanol. In argon atmosphere, to thus obtain 113.5 g (329 mmol) of N-[(1E)-(6-bromopyridin-2-yl)methylene]-2,6-diisopropylaniline, 33.16 g (526 mmol) of NaBH₃CN, 9 ml of AcOH and 1000 ml of methanol were added. This mixture was refluxed for 12 h, then cooled to room temperature, poured into 1000 ml of water, and crude product was extracted with 3×200 ml of ethyl acetate. The combined extract was dried over $Na_2SO_4$ and evaporated to dryness. The residue was purified by flash chromatography on silica gel 60 (40-63 um, eluent: hexane-ethyl acetate=10:1, vol.). Yield 104.4 g (66%) of a yellow oil. Anal. calc. for $C_{18}H_{23}BrN_2$: C, 62.25; H, 6.68; N, 8.07. Found: C, 62.40; H, 6.87; N, 7.90. $^1$H NMR ($CDCl_3$): δ 7.50 (m, 1H, 4-H in Py), 7.38 (m, 1H, 5-H in Py), 7.29 (m, 1H, 3-H in Py), 7.05-7.12 (m, 3H, 3, 4, 5-H in 2, 6-$^i$Pr₂C₆H₃), 4.18 (s, 2H, CH₂NH), 3.94 (br.s, 1H, NH), 3.33 (sept, J=6.8 Hz, 2H, CHMe₂), 1.23 (d, J=6.8 Hz, 12H, CHMe₂).

N-[(1E)-(6-Bromopyridin-2-yl)methylene]-2,6-bis(1-ethylpropyl)aniline (12)

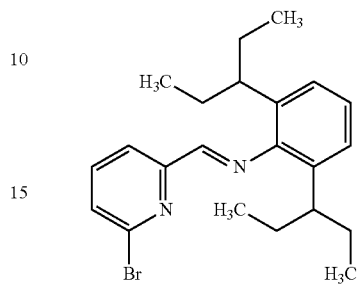

A mixture of 8.00 g (43 mmol) of 6-bromopyridine-2-carbaldehyde, 10.0 g (43 mmol) of 2,6-bis(1-ethylpropyl)aniline in 80 ml of ethanol was refluxed for 8 h. The obtained solution was evaporated to dryness and the residue was re-crystallized from 20 ml of methanol. Yield 11.2 g (65%) of yellow crystalline powder. Anal. calc. for $C_{22}H_{29}BrN_2$: C, 65.83; H, 7.28; N, 6.98. Found: C, 66.01; H, 7.23; N, 6.90. $^1$H NMR ($CDCl_3$): δ 8.21 (m, 1H, 5-H in Py), 8.15 (s, 1H, CH=N), 7.69 (m, 1H, 4-H in Py), 7.59 (m, 1H, 3-H in Py), 7.10 (m, 1H, 4-H in dipentylphenyl), 7.03-7.04 (m, 2H, 3, 5-H in dipentylphenyl), 2.48 (m, 2H, CHEt₂), 1.54 (m, 8H, CH₂Me), 0.74 (t, J=7.3 Hz, 12H, CH₂Me).

N-[(6-Bromopyridin-2-yl)methyl]-2,6-bis(1-ethylpropyl)aniline (13)

In argon atmosphere, a mixture of 11.2 g (28 mmol) of N-[(1E)-(6-bromopyridin-2-yl)methylene]-2,6-bis(1-ethylpropyl)aniline, 2.80 g (45 mmol) of NaBH₃CN, 1 ml of AcOH and 230 ml of methanol was refluxed for 12 h. The obtained mixture was cooled, poured into 300 ml of water, and then crude product was extracted with 3×200 ml of ethyl acetate. The combined extract was dried over $Na_2SO_4$ and evaporated to dryness. Yield 10.3 g (93%) of yellow oil. Anal. calc. for $C_{23}H_{31}BrN_2$: C, 65.50; H, 7.75; N, 6.94. Found: C, 65.36; H, 7.69; N, 6.82. $^1$H NMR ($CDCl_3$): δ 7.52 (m, 1H, 4-H in Py), 7.41 (m, 1H, 3-H in Py), 7.38 (m, 1H, 5-H in Py), 7.03-7.08 (m, 1H, 4-H in dipentylphenyl), 6.97-6.99 (m, 2H, 3, 5-H in dipentylphenyl), 4.10 (s, 2H, CH₂NH), 3.73 (br.s, 1H, NH), 2.86 (m, 2H, CHEt₂), 1.70 (m, 4H, CH₂Me), 1.49 (m, 4H, CH₂Me), 0.79 (t, J=7.3 Hz, 12H, CH₂Me).

2-Methyl-N-{[1-(4,4,5,5-tetramethyl-1,3,2-dioxaborolan-2-yl)-2-naphthyl]methyl}aniline (16)

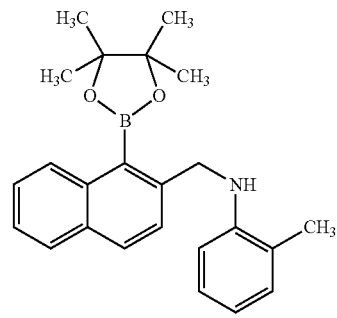 [SMILES: Cc1ccccc1NCc1ccc2ccccc2c1B1OC(C)(C)C(C)(C)O1]

A mixture of 10.8 g (101 mmol) of 2-methylaniline, 23.3 g (67.0 mmol) of 2-[2-(bromomethyl)-1-naphthyl]-4,4,5,5-tetramethyl-1,3,2-dioxaborolane, and 10.2 g (74.0 mmol) of $K_2CO_3$ in 450 cm³ of DMF was stirred for 12 h at 80° C. The resulting mixture was poured into 1000 cm³ of water. The product was extracted with 3×200 ml of ethyl acetate. The combined extract was dried over $MgSO_4$ and then evaporated to dryness. The residue was re-crystallized from a mixture of 200 ml of hexane and 10 ml of ethyl acetate. Yield 15.7 g (63%) of brown crystalline powder. Anal. calc. for $C_{24}H_{28}BNO_2$: C, 77.22; H, 7.56; N, 3.75. Found: C, 77.33; H, 7.67; N, 3.59. ¹H NMR (CDCl₃): δ 8.20 (m, 1H, 8-H in naphthyl), 7.84 (d, J=8.5 Hz, 1H, 4-H in naphthyl), 7.82 (m, 1H, 5-H in naphthyl), 7.42-7.52 (m, 3H, 3, 6, 7-H in naphthyl), 7.14 (m, 1H, 5-H in 2-MeC₆H₄), 7.05 (m, 1H, 3-H in 2-MeC₆H₄), 6.78 (m, 1H, 6-H in 2-MeC₆H₄), 6.68 (m, 1H, 4-H in 2-MeC₆H₄), 4.53 (s, 2H, CH₂NH), 3.95 (br.s, 1H, NH), 2.11 (s, 3H, Me), 1.36 (s, 12H, BPin).

2,6-Bis(1-ethylpropyl)-N-{[6-(2-{[(2-methylphenyl)amino]methyl}-1-naphthyl)pyridin-2-yl]methyl}aniline (L⁶H₂)

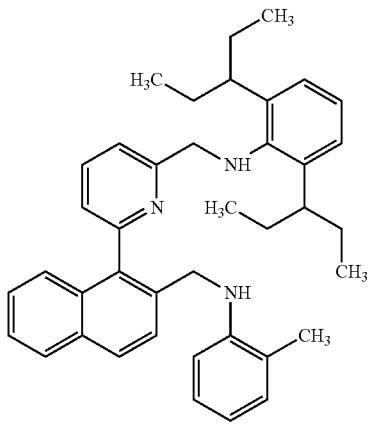 [SMILES: CCC(CC)c1cccc(C(CC)CC)c1NCc1cccc(-c2c(CNc3ccccc3C)ccc3ccccc23)n1]

A mixture of 2.50 g (6.7 mmol) of $Na_2CO_3 \times 10H_2O$, 69 ml of water and 22 ml of methanol was purged with argon for 30 min. The obtained solution was added to a mixture of 2.50 g (6.7 mmol) of 2-methyl-N-{[1-(4,4,5,5-tetramethyl-1,3,2-dioxaborolan-2-yl)-2-naphthyl]methyl}aniline, 2.70 g (6.7 mmol) of N-[(6-bromopyridin-2-yl)methyl]-2,6-bis(1-ethylpropyl)aniline, and 0.39 g (0.34 mmol) of Pd(PPh₃)₄ in 90 ml of toluene. This mixture was stirred for 12 h at 70° C., then cooled to room temperature. The organic layer was separated, the aqueous layer was extracted with 3×50 ml of ethyl acetate. The combined organic extract was washed with brine, dried over $Na_2SO_4$, and evaporated to dryness. The residue was re-crystallized from 5 ml of diethyl ether. Yield 2.20 g (58%) of white crystalline powder. Anal. calc. for $C_{39}H_{45}FN_3$: C, 84.31; H, 8.31; N, 7.37. Found: C, 84.28; H, 8.26; N, 7.19. ¹H NMR (CDCl₃): δ 7.90 (d, J=8.5 Hz, 1H), 7.88 (m, 1H), 7.83 (m, 1H), 7.66 (d, J=8.5 Hz, 1H), 7.60 (m, 1H), 7.35-7.49 (m, 4H), 6.96-7.07 (m, 5H), 6.61 (m, 1H), 6.53 (m, 1H), 4.17-4.32 (m, 4H), 3.92 (br.m, 1H), 3.85 (br.s, 1H), 2.88 (m, 2H), 2.08 (s, 3H), 1.62 (m, 4H), 1.49 (m, 4H), 0.73 (t, J=7.1 Hz, 6H), 0.71 (t, J=7.1 Hz, 6H).

4,4,5,5-Tetramethyl-2-(2-methylphenyl)-1,3,2-dioxaborolane (20)

To 200 ml (0.21 mol) of 1.07 M solution of 2-methyl phenylmagnesiumbromide in THF, 49.3 g (0.27 mmol) of 2-isopropoxy-4,4,5,5-tetramethyl-1,3,2-dioxaborolane was added at room temperature. The resulting solution was stirred for 15 min at the same temperature, and then 50 ml of water was added. The formed mixture was poured into 500 ml of water, and crude product was extracted with 3×200 ml of ethyl acetate. The combined organic extract was dried over $Na_2SO_4$ and then evaporated to dryness. Fractional distillation of the residue in vacuum gave colorless oil, b.p. 81-84° C./3 mmm Hg. Yield 33.1 g (57%). Anal. calc. for $C_{13}H_{19}BO_2$: C, 71.59; H, 8.78. Found: C, 71.78; H, 8.65. ¹H NMR (CDCl₃): 7.78 (m, 1H, 6-H), 7.33 (m, 1H, 5-H), 7.16-7.19 (m, 2H, 3, 4-H), 2.56 (s, 3H, Me in 2-MeC₆H₄), 1.36 (s, 12H, Bpin).

2-[2-(Bromomethyl)phenyl]-4,4,5,5-tetramethyl-1,3,2-dioxaborolane (21)

A mixture of 32.3 g (148 mmol) of 4,4,5,5-tetramethyl-2-(2-methylphenyl)-1,3,2-dioxaborolane, 25.0 g (141 mmol) of N-bromosuccinimide, and 0.32 g (2.62 mmol) of AIBN was refluxed in 1000 ml of acetonitrile for 2 h. The mixture was then cooled to room temperature and then evaporated to dryness. The residue was dissolved in 500 ml of hexane. The formed precipitate was filtered on glass frit (G3), and the filtrate was evaporated to dryness to give yellowish crystalline powder. Yield 28.9 g (66%). Anal. calc. for $C_{13}H_{18}BBrO_2$: C, 52.57; H, 6.11. Found: C, 52.63; H, 6.29. ¹H NMR (CDCl₃): 7.81 (m, 1H, 6-H), 7.37-7.42 (m, 2H, 3, 5-H), 7.28 (m, 1H, 4-H), 4.91 (s, 2H, CH₂Br), 1.37 (s, 1H, Bpin).

2-Methyl-N-[2-(4,4,5,5-tetramethyl-1,3,2-dioxaborolan-2-yl)benzyl]aniline (22)

A mixture of 1.60 g (15 mmol) of 2-methylaniline, 3.00 g (10 mmol) of 2-[2-(bromomethyl)-phenyl]-4,4,5,5-tetramethyl-1,3,2-dioxaborolane, and 1.52 g (11 mmol) of $K_2CO_3$ in 75 ml of DMF was stirred for 12 h at 80° C. The resulting mixture was poured into 300 ml of water. The product was extracted with 3×50 ml of ethyl acetate. The combined extract was dried over $Na_2SO_4$ and then evaporated to dryness. An excess of 2-methylaniline was distilled off using Kugelrohr apparatus. The residue was re-crystallized from 20 ml of n-hexane. Yield 1.82 g (56%) of red crystalline powder. Anal. calc. for $C_{20}H_{26}BNO_2$: C, 74.32; H, 8.11; N, 4.33. Found: C, 73.99; H, 8.02; N, 4.45. ¹H NMR (CDCl₃): δ 7.82 (m, 1H, 5-H in 2-MeC₆H₄), 7.36-7.41 (m, 2H, 3, 5-H in C₆H₄CH₂), 7.26 (m, 1H, 4-H in C₆H₄CH₂), 7.08 (m, 1H, 5-H in 2-MeC₆H₄), 7.02 (m, 1H, 3-H in 2-MeC₆H₄), 6.71 (m, 1H, 6-H in 2-MeC₆H₄), 6.61 (m, 1H, 4-H in 2-MeC₆H₄), 4.55 (br.s, 2H, CH₂NH), 4.31 (br.s, 1H, NH), 2.13 (s, 3H, Me in 2-MeC₆H₄), 1.31 (s, 12H, Bpin).

2,6-Diisopropyl-N-{[6-(2-{[(2-methylphenyl)amino]methyl}phenyl)pyridin-2-yl]methyl}aniline (L⁷H₂)

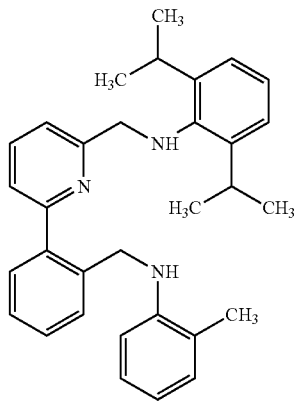 [SMILES: Cc1ccccc1NCc1ccccc1-c1cccc(CNc2c(C(C)C)cccc2C(C)C)n1]

A mixture of 4.00 g (14 mmol) of Na₂CO₃×10H₂O, 60 ml of water and 20 ml of methanol was purged with argon for 30 min. The obtained solution was added to a mixture of 1.82 g (5.6 mmol) of 2-methyl-N-[2-(4,4,5,5-tetramethyl-1,3,2-dioxaborolan-2-yl)benzyl]aniline, 1.95 g (6.7 mmol) of N-[(6-Bromopyridin-2-yl)methyl]-2,6-diisopropylaniline, and 0.32 g (0.28 mmol) of Pd(PPh₃)₄ in 75 ml of toluene. This mixture was stirred for 12 h at 70° C., then cooled to room temperature. The organic layer was separated, the aqueous layer was extracted with 3×50 ml of ethyl acetate. The combined organic extract was washed with brine, dried over Na₂SO₄, and evaporated to dryness. The residue was re-crystallized from 15 ml of diethyl ether. Yield 1.79 g (69%) of white crystalline powder. Anal. calc. for $C_{32}H_{37}N_3$: C, 82.89; H, 8.04; N, 9.04. Found: C, 82.68; H, 7.98; N, 8.80. ¹H NMR (CDCl₃): δ 7.70 (m, 1H), 7.49-7.55 (m, 2H), 7.41 (d, J=8.4 Hz, 1H), 7.37-7.40 (m, 2H), 7.28 (m, 1H), 6.99-7.11 (m, 5H), 6.60 (m, 1H), 6.55 (m, 1H), 4.48 (d, J=4.6 Hz, 2H), 4.21 (s, 2H), 4.07 (br.s, 1H), 3.98 (br.s, 1H), 3.33 (sept, J=6.8 Hz, 2H), 2.04 (s, 3H), 1.19 (d, J=6.8 Hz, 12H).

2-(2,6-Dimethylphenyl)-4,4,5,5-tetramethyl-1,3,2-dioxaborolane (34)

To a solution of 35.0 g (0.19 mol) of 2,6-dimethylbromobenzene cooled to −78° C., 76 ml (0.19 mol) of 2.5 M nBuLi in hexanes was added for 40 min. The resulting mixture was stirred at this temperature for 1 h, then 35.2 g (0.19 mol) of 2-isopropoxy-4,4,5,5-tetramethyl-1,3,2-dioxaborolane was added. The resulting mixture was stirred overnight at room temperature and then evaporated to dryness. The residue was poured into 500 ml of water, crude product was extracted with 3×200 ml of ethyl acetate. The combined organic extract was dried over Na₂SO₄ and then evaporated to dryness. Yield 19.5 g (53%) of yellow crystalline solid. Anal. calc. for $C_{14}H_{21}BO_2$: C, 72.44; H, 9.12. Found: C, 72.78; H, 9.45. ¹H NMR (CDCl₃): δ 7.12 (t, J=7.7 Hz, 1H, 4-H), 6.94 (d, J=7.7 Hz, 2H, 3, 5-H), 2.40 (s, 6H, 2, 6-Me), 1.38 (s, 12H, Bpin).

2-[2-(Bromomethyl)-6-methylphenyl]-4,4,5,5-tetramethyl-1,3,2-dioxaborolane (35)

A mixture of 43.0 g (185 mmol) of 2-(2,6-dimethylphenyl)-4,4,5,5-tetramethyl-1,3,2-dioxaborolane, 42.9 g (241 mmol) of N-bromosuccinimide, and 0.40 g (3.27 mmol) of AIBN in 1000 ml of acetonitrile was refluxed for 2 h. Then, this mixture was cooled to room temperature and evaporated to dryness. The residue was dissolved in 500 ml of hexane. The precipitate was filtered on glass frit (G3), and the filtrate was evaporated to dryness to give yellowish crystalline solid. Yield 37.9 g (66%). Anal. calc. for $C_{14}H_{20}BBrO_2$: C, 54.06; H, 6.48. Found: C, 54.35; H, 6.72. ¹H NMR (CDCl₃): δ 7.21 (m, 1H, 4-H), 7.15 (m, 1H, 3-H), 7.07 (m, 1H, 5-H), 4.72 (s, 2H, CH₂Br), 2.44 (s, 3H, 6-Me), 1.42 (s, 12H, Bpin).

2-Methyl-N-[3-methyl-2-(4,4,5,5-tetramethyl-1,3,2-dioxaborolan-2-yl)benzyl]aniline (36)

A mixture of 2.09 g (19.5 mmol) of 2-methylaniline, 4.00 g (13.0 mmol) of 2-[2-(bromomethyl)-6-methylphenyl]-4,4,5,5-tetramethyl-1,3,2-dioxaborolane, and 1.97 g (14.3 mmol) of K₂CO₃ in 75 ml of DMF was stirred for 12 h at the 80° C. The resulting mixture was poured into 300 ml of water. The product was extracted with 3×50 ml of ethyl acetate. The combined extract was dried over Na₂SO₄ and then evaporated to dryness. An excess of 2-methylaniline was distilled off using Kugelrohr apparatus. The residue was re-crystallized from 20 ml of hexane. Yield 2.60 g (59%) of light-yellow powder. Anal. calc. for $C_{21}H_{28}BNO_2$: C, 74.79; H, 8.37; N, 4.15. Found: C, 74.95; H, 8.52; N, 3.95. ¹H NMR (CDCl₃): δ 7.22 (m, 1H, 3-H in 6-MeC₆H₃CH₂), 7.16 (m, 1H, 3-H in 6-MeC₆H₃CH₂), 7.12 (m, 1H, 5-H in 2-MeC₆H₄), 7.09 (m, 1H, 5-H in 6-MeC₆H₃CH₂), 7.04 (m, 1H, 3-H in 2-MeC₆H₄), 6.71 (m, 1H, 6-H in 2-MeC₆H₄), 6.66 (m, 1H, 4-H in 2-MeC₆H₄), 4.34 (d, J=25.3 Hz, 1H, CHH'NH), 4.27 (d, J=25.3 Hz, 1H, CHH'NH), 3.85 (br.s, 1H, NH), 2.46 (s, 3H, Me in 6-MeC₆H₃CH₂), 2.11 (s, 3H, Me in 2-MeC₆H₄), 1.25 (s, 12H, Bpin).

2,6-Diisopropyl-N-{[6-(2-methyl-6-{[(2-methylphenyl)amino]methyl}phenyl)pyridin-2-yl]methyl}aniline (L⁸H₂)

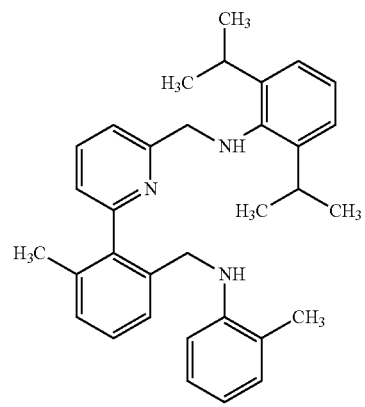 [SMILES: Cc1ccccc1NCc1cccc(C)c1-c1cccc(CNc2c(C(C)C)cccc2C(C)C)n1]

A mixture of 5.50 g (19 mmol) of Na₂CO₃×10H₂O, 100 ml of water and 30 ml of methanol was purged with argon for 30 min. The obtained solution was added to a mixture of 2.60 g (7.7 mmol) of 2-methyl-N-[3-methyl-2-(4,4,5,5-tetramethyl-1,3,2-dioxaborolan-2-yl)benzyl]aniline, 2.68 g (7.7 mmol) of N-[(6-bromopyridin-2-yl)methyl]-2,6-diisopropylaniline, and 0.44 g (0.39 mmol) of Pd(PPh₃)₄ in 120 ml of toluene. This mixture was stirred for 12 h at 70° C., then cooled to room temperature. The organic layer was separated, the aqueous layer was extracted with 3×50 ml of ethyl acetate. The combined organic extract was washed with brine, dried over Na₂SO₄, and evaporated to dryness. The residue was purified by flash chromatography on silica gel 60 (40-63 um; eluent: hexane-triethylamine=20:1, vol.). Yield 2.10 g (57%) of white crystalline solid. Anal. calc. for $C_{33}H_{39}N_3$: C, 82.97; H, 8.23; N, 8.80. Found: C, 83.19; H, 8.45; N, 8.62. ¹H NMR (CDCl₃): δ 7.71 (m, 1H), 7.37 (m, 1H), 7.28-7.32 (m, 2H), 7.22-7.26 (m, 2H), 7.00-7.13 (m, 5H), 6.61 (m, 1H), 6.47 (m, 1H), 4.25 (s, 2H), 4.10 (s, 2H), 3.98 (br.s, 1H), 3.82 (br.s, 1H), 3.31 (s, J=6.9 Hz, 2H), 2.14 (s, 3H), 2.09 (s, 3H), 1.21 (d, J=6.9 Hz, 12H).

2,6-Diisopropyl-N-{[6-(2-{[(2-methylphenyl)amino]methyl}-1-naphthyl)pyridin-2-yl]methyl}aniline (L⁹H₂)

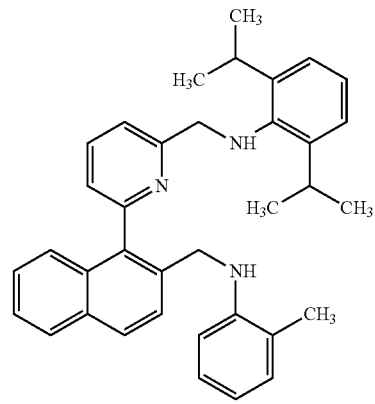 [SMILES: Cc1ccccc1NCc1ccc2ccccc2c1-c1cccc(CNc2c(C(C)C)cccc2C(C)C)n1]

A mixture of 27.2 g (95.0 mmol) of Na$_2$CO$_3 \times$10H$_2$O, 410 ml of water and 120 ml of methanol was purged with argon for 30 min. The obtained solution was added to a mixture of 14.2 g (38.0 mmol) of 2-methyl-N-{[1-(4,4,5,5-tetramethyl-1,3,2-dioxaborolan-2-yl)-2-naphthyl]methyl}aniline, 13.3 g (38.0 mmol) of N-[(6-bromopyridin-2-yl)methyl]-2,6-diisopropylaniline, and 2.19 g (1.90 mmol) of Pd(PPh$_3$)$_4$ in 500 ml of toluene. This mixture was stirred for 12 h at 70° C., then cooled to room temperature. The organic layer was separated, the aqueous layer was extracted with 3×200 ml of ethyl acetate. The combined organic extract was washed with brine, dried over Na$_2$SO$_4$ and evaporated to dryness. The residue was purified by flash chromatography on silica gel 60 (40-63 um, eluent: hexane-ethyl acetate-triethylamine=100:20:1, vol.). Yield 10.1 g (52%) of a yellow powder. Anal. calc. for C$_{36}$H$_{39}$N$_3$: C, 84.17; H, 7.65; N, 8.18. Found: C, 84.28; H, 7.73; N, 8.09. $^1$H NMR (CDCl$_3$): δ 7.91 (d, J=8.4 Hz, 1H, 4-H in naphthyl), 7.89 (m, 1H, 8-H in naphthyl), 7.79 (m, 1H, 4-H in Py), 7.66 (d, J=8.4 Hz, 1H, 3-H in naphthyl), 7.47 (m, 1H, 7-H in naphthyl), 7.36-7.42 (m, 4H, 3, 5-H in Py and 5, 6-H in naphthyl), 7.04-7.10 (m, 3H, 3, 5-H in ortho-tolyl and 4-H in 2,6-diisopropylphenyl), 7.01 (m, 2H, 3, 5-H in 2,6-diisopropylphenyl), 6.61 (m, 1H, 4-H in ortho-tolyl), 6.52 (m, 1H, 6-H in ortho-tolyl), 4.22-4.35 (m, 4H, CH$_2$N), 4.02 (br.s, 1H, NH), 3.93 (br.s, 1H, NH), 3.28 (sept, J=6.8 Hz, 2H, CHMe$_2$), 2.09 (s, 3H, Me in ortho-tolyl), 1.16 (d, J=6.8 Hz, 6H, CHMeMe'), 1.14 (d, J=6.8 Hz, 6H, CHMeMe').

Synthesis of group 4 pyridyldiamides

The preparation of group 4 pyridyldiamides are described below. The general synthetic route described here involves the reaction of the pryridyldiamine ligand with a group 4 metal amide precursor to afford a pyridyldiamide metal dichloride complex, which can then be subsequently reacted with a dialkylmagnesium, grignard, or alkyllithium reagent to afford precatalysts suitable for activation with typical non-coordinating anion activators (e.g., N,N-dimethylanilinium tetrakis(pentafluorophenylborate). Another useful synthetic route to group 4 pyridyldiamidedichloride complexes (i.e., (pyridyldiamide)MCl$_2$, where M=group 4 metal) is the reaction of a pre-formed or in situ formed dilithiopyridyldiamide species with a group 4 halide.

Synthesis of L$^1$HfCl$_2$

Toluene was added to L$^1$H$_2$ (0.280 g, 0.560 mmol) and Hf(NMe$_2$)$_2$Cl$_2$(dme) (0.240 g, 0.560 mmol) to form a yellow solution. The mixture was loosely capped with aluminum foil and heated to 110° C. After 3.5 hours yellow precipitate had formed. The volatiles were removed under a stream of nitrogen and the resulting solid was suspended in Et$_2$O (6 mL). The solid was collected on a glass frit and dried under reduced pressure at 70° C. to afford a yellow solid (0.355 g, 84.9%). $^1$H NMR (CD$_2$Cl$_2$): δ 8.25 (t, 1H), 8.12 (d, 1H), 8.00 (m, 1H), 7.92 (m, 2H), 7.74-7.60 (m, 4H), 7.30 (m, 4H), 7.34-7.05 (m, 3H), 6.95 (m, 1H), 4.47 (AB quartet, 2H), 2.78 (hex, 1H), 2.34 (m, 3H), 1.36 (s, 3H), 1.13 (s, 3H), 1.04 (t, 3H), 0.96 (t, 3H).

Synthesis of L$^1$HfMe$_2$

Dichloromethane (10 mL) was added to L$^1$HfCl$_2$ (0.346 g, 0.463 mmol) to form a clear yellow solution. At −40° C. a solution of Me$_2$Mg (2.46 mL, 0.579 mmol) in Et$_2$O was added dropwise. The mixture was allowed to warm to ambient temperature. After 1 hour the volatiles were evaporated under a stream of nitrogen and the residue was dried under reduced pressure. The resulting solid was extracted with CH$_2$Cl$_2$ (6 mL) and filtered. The filtrate was evaporated to afford a yellow solid that was dried under reduced pressure to afford the product with 0.17 equivalents of cocrystallized CH$_2$Cl$_2$ (0.326 g, 97.7%). $^1$H NMR (CD$_2$Cl$_2$): δ 8.15-8.05 (m, 2H), 7.97 (m, 1H), 7.84-7.74 (m, 3H), 7.55 (m, 3H), 7.22 (m, 2H), 7.10-7.02 (m, 5H), 6.83 (m, 1H), 4.39 (AB quartet, Δυ=68 Hz, J=11 Hz), 2.80 (hex, 1H), 2.50-2.28 (m, 3H), 1.24 (s, 3H), 1.17 (s, 3H), 1.02 (guar, 6H), −0.45 (s, 3H), −1.33 (s, 3H).

Synthesis of L$^2$HfMe$_2$

Prepared from L$^2$H$_2$ using a procedure analogous to that described for L$^1$HfMe$_2$. Overall yield (based on pyridyldiamine): 0.22 g, 70%. $^1$H NMR (CD$_2$Cl$_2$): δ 8.12-6.82 (aromatic resonances, 17H), 4.40 (AB quartet, Δυ=85 Hz, J=12 Hz), 3.33 (sept, 1H), 3.22 (sept, 1H), 1.32 (s, 3H), 1.14 (s, 3H), 1.10-1.03 (m, 9H), 0.96 (d, 3H), −0.30 (s, 3H), −1.21 (s, 3H).

Synthesis of L$^3$HfMe$_2$

Prepared from L$^3$H$_2$ using a procedure analogous to that described for L$^1$HfMe$_2$. Overall yield (based on pyridyldiamine): 0.20 g, 50%. $^1$H NMR (CD$_2$Cl$_2$): δ 8.11-6.75 (aromatic resonances, 13H), 4.20 (AB quartet, Δυ=306 Hz, J=12 Hz), 2.45 (s, 3H), 2.30 (s, 3H), 2.23 (s, 3H), 2.18 (s, 3H), 2.08 (s, 3H), 1.95 (s, 3H), 1.64 (s, 3H), 1.37 (s, 3H), −1.06 (s, 3H), −1.12 (s, 3H).

Synthesis of L$^4$HfMe$_2$

Prepared from L$^4$H$_2$ using a procedure analogous to that described for L$^1$HfMe$_2$. Overall yield (based on pyridyldiamine): 0.15 g, 45%. $^1$H NMR (CD$_2$Cl$_2$): δ 8.12-6.82 (aromatic resonances, 14H), 4.21 (AB quartet, Δυ=286 Hz, J=12 Hz), 3.13 (hex, 1H), 2.71-2.50 (m, 2H), 2.48 (s, 3H), 2.23 (s, 3H), 2.28 (m, 1H), 2.06 (s, 3H), 1.52 (s, 3H), 1.31 (s, 3H), 1.07 (t, 3H), 0.83 (t, 3H), −1.00 (s, 3H), −1.13 (s, 3H).

Synthesis of L$^5$HfMe$_2$

Prepared from L$^5$H$_2$ using a procedure analogous to that described for L$^1$HfMe$_2$ with the exceptions that the pyridyldiamine was reacted with Hf(NMe$_2$)$_2$Cl$_2$(dme) in xylenes at 130° C. Overall yield (based on pyridyldiamine): 0.13 g, 23%. The isolated product contained approximately 10% (by integrated intensity) of an unidentified impurity. $^1$H NMR (CD$_2$Cl$_2$): δ 8.12-6.80 (aromatic resonances, 14H), 4.20 (AB quartet, Δυ=301 Hz, J=12 Hz), 3.79 (sept, 1H), 3.17 (sept, 1H), 2.45 (s, 3H), 2.23 (s, 3H), 2.08 (s, 3H), 1.58 (s, 3H), 1.34 (s, 3H), 1.20 (d, 6H), 1.01 (d, 3H), 0.39 (d, 3H), −0.79 (s, 3H), −1.00 (s, 3H).

Synthesis of L$^7$HfMe$_2$

Toluene (6 mL) was added to L$^7$H$_2$ (0.194 g, 0.418 mmol) and Hf(NMe$_2$)$_2$Cl$_2$(dme) (0.179 g, 0.418 mmol) to form a pale yellow solution. The mixture was loosely capped with aluminum foil and heated to 95° C. After 2.5 hours the volatiles were removed with a stream of nitrogen. Then Et$_2$O (5 mL) was added and the mixture was stirred to give an off-white suspension. The solid was collected by filtration and dried under reduced pressure to afford 0.233 g of presumed dichloride (i.e., L$^7$HfCl$_2$) product. Methylene chloride (7 mL) was added to the dichloride and the mixture was cooled to −40° C. An Et$_2$O solution of Me$_2$Mg (1.67 mL, 0.393 mmol) was then added dropwise and the mixture was allowed to warm to ambient temperature. After reaching ambient temperature the volatiles were removed under a stream of nitrogen. The crude product was extracted with CH$_2$Cl$_2$ (5 mL)

and filtered. Most of the CH$_2$Cl$_2$ was evaporated and hexanes (3 mL) were added to afford a suspension. The pale pink solid was isolated by filtration and dried under reduced pressure at 45° C. Yield: 0.239 g, 85.3%. $^1$H NMR (CD$_2$Cl$_2$): δ 8.01 (t, 1H), 7.6-6.8 (m, 13H), 5.03 (br AB quartet, 2H, Δυ=247 Hz, J=20 Hz), 4.50 (br, 1H), 4.03 (br, 1H), 3.73 (br, 1H), 3.15 (br, 1H), 2.34 (br, 3H), 1.16 (d, 9H), 0.68 (s, 3H), −0.72 (s, 3H), −0.84 (s, 3H).

Synthesis of L$^8$HfMe$_2$

Toluene (6 mL) was added to L$^8$H$_2$ (0.248 g, 0.519 mmol) and Hf(NMe$_2$)$_2$Cl$_2$(dme) (0.222 g, 0.519 mmol) to form a pale yellow solution. The mixture was loosely capped with aluminum foil and heated to 95° C. After 2.5 hours the volatiles were removed with a stream of nitrogen. Then Et$_2$O (5 mL) was added and the mixture was stirred to give an off-white suspension. The solid was collected by filtration and dried under reduced pressure to afford 0.355 g of presumed dichloride (i.e., L$^8$HfCl$_2$) product. Methylene chloride (7 mL) was added to the dichloride and the mixture was cooled to −40° C. An Et$_2$O solution of Me$_2$Mg (2.50 mL, 0.588 mmol) was then added dropwise and the mixture was allowed to warm to ambient temperature. After reaching ambient temperature the volatiles were removed under a stream of nitrogen. The crude product was extracted with CH$_2$Cl$_2$ (5 mL) and filtered. The volatiles were evaporated and the resulting off-white solid was dried under reduced pressure. Yield: 0.315 g, 88.7%. $^1$H NMR (CD$_2$Cl$_2$): δ 7.99 (t, 1H), 7.50-6.93 (m, 12H), 5.01 (AB quartet, 2H, Δυ=141 Hz, J=21 Hz), 4.22 (br, 1H), 3.98 (br, 1H), 3.81 (sept, 1H), 2.96 (br, 1H), 2.24 (br, 3H), 2.22 (s, 3H), 1.18 (m, 6H), 1.12 (d, 3H), 0.55 (d, 3H), −0.76 (br, 3H), −0.81 (s, 3H).

Synthesis of L$^9$HfMe$_2$

Toluene (50 mL) was added to L$^9$H$_2$ (2.07 g, 4.03 mmol) and Hf(NMe$_2$)$_2$Cl$_2$(dme) (1.73 g, 4.03 mmol) to form a yellow solution. The mixture was loosely capped with aluminum foil and heated to 95° C. After 2.5 hours the solution was cooled to ambient temperature for a couple of hours. The resulting solid was collected on a glass frit, washed with toluene (2×5 mL) and dried under reduced pressure to afford 2.40 g of the dichloride (i.e., L$^9$HfCl$_2$) product with 0.5 equivalents of co-crystallized toluene. Methylene chloride (50 mL) was added to the dichloride and the mixture was cooled to −40° C. An Et$_2$O solution of Me$_2$Mg (15.3 mL, 3.59 mmol) was then added dropwise and the mixture was allowed to warm to ambient temperature. After stirring at ambient temperature for 0.5 hours the volatiles were removed under a stream of nitrogen. The crude product was extracted with CH$_2$Cl$_2$ (20 mL) and filtered. The CH$_2$Cl$_2$ was evaporated to afford a solid that was washed with pentane (2×10 mL) and dried under reduced pressure. Yield: 2.01 g, 69.2%. $^1$H NMR (CD$_2$Cl$_2$): δ 8.2-6.9 (m, 16H), 5.06 (AB quartet, 2H, Δυ=162 Hz, J=26 Hz), 4.97 (br, 1H), 4.14 (br, 1H), 3.73 (sept, 1H), 3.02 (br, 1H), 2.30 (br, 3H), 1.4-1.0 (m, 9H), 0.89 (t, 2H), 0.55 (d, 3H), −0.80 (s, 3H), −1.14 (s, 3H).

General Polymerization Procedures

Unless stated otherwise, propylene homopolymerizations and ethylene-propylene copolymerizations were carried out in a parallel, pressure reactor, as generally described in U.S. Pat. No. 6,306,658; U.S. Pat. No. 6,455,316; U.S. Pat. No. 6,489,168; WO 00/09255; and Murphy et al., 125 J. AM. CHEM. SOC., pp. 4306-4317 (2003), each of which is fully incorporated herein by reference for US purposes. Although the specific quantities, temperatures, solvents, reactants, reactant ratios, pressures, and other variables are frequently changed from one polymerization run to the next, the following describes a typical polymerization performed in a parallel, pressure reactor.

A pre-weighed glass vial insert and disposable stirring paddle were fitted to each reaction vessel of the reactor, which contains 48 individual reaction vessels. The reactor was then closed and propylene (typically 1 mL) was introduced to each vessel as a condensed gas liquid. If ethylene was added as a comonomer, it was added before the propylene as a gas to a pre-determined pressure (typically 10-80 psi) while the reactor vessels were heated to a set temperature (typically 40° C.). Then solvent (typically isohexane) was added to bring the total reaction volume, including the subsequent additions, to 5 mL and the reactor vessels were heated to their set temperature (usually between 50° C. and 110° C.). At this time scavenger and/or co-catalyst and/or a chain transfer agent, such as tri-n-octylaluminum in toluene (typically 100-1000 Nmol), was added.

The contents of the vessel were stirred at 800 rpm. An activator solution (typically 1.0-1.2 molar equivalents of dimethyl anilinium tetrakis-pentafluorophenyl borate dissolved in toluene or 100-1000 molar equivalents of methyl alumoxane (MAO) in toluene) was then injected into the reaction vessel along with 500 microliters of toluene, followed by a toluene solution of catalyst (typically 0.40 mM in toluene, usually 20-40 nanomols of catalyst) and another aliquot of toluene (500 microliters). Equivalence is determined based on the mol equivalents relative to the moles of the transition metal in the catalyst component.

The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine percent ethylene incorporation, and by DSC (see below) to determine melting point.

To determine various molecular weight related values by GPC, high temperature size exclusion chromatography was performed using an automated "Rapid GPC" system as generally described in U.S. Pat. No. 6,491,816; U.S. Pat. No. 6,491,823; U.S. Pat. No. 6,475,391; U.S. Pat. No. 6,461,515; U.S. Pat. No. 6,436,292; U.S. Pat. No. 6,406,632; U.S. Pat. No. 6,175,409; U.S. Pat. No. 6,454,947; U.S. Pat. No. 6,260,407; and U.S. Pat. No. 6,294,388. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector. The molecular weights presented are relative to linear polystyrene standards and are uncorrected.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./min and then cooled at a rate of 50° C./min. Melting points were collected during the heating period. The weight percent of ethylene incorporated in the ethylene-propylene copolymers was determined by rapid FT-IR spectroscopy on a Bruker Equinox 55+IR in reflection mode. Samples were prepared in a thin film format by evaporative deposition techniques. Weight percent ethylene was obtained from the ratio of peak heights at 744-715 and 1189-1126 cm-1. This method was calibrated using a set of ethylene/propylene copolymers with a range of known wt % ethylene content.

Propylene Polymerization Example 1

Shown in Table 1 are a series of propylene polymerizations that demonstrate that $L^2HfMe_2$, $L^3HfMe_2$, and $L^4HfMe_2$, when activated with N,N-dimethylanilium tetrakis(perfluorophenyl)borate, are capable of forming crystalline polypropylene with melting points above 120° C. Conditions: isohexane solvent, propylene added=1 mL, total volume=5 mL, N,N-dimethylanilinium tetrakis(pentafluorophenyl)borate activator (1.1 equivalent), tri-n-octylaluminum (300 nmol). Activities given in grams polymer/mmol catalyst/hour. The concentration of catalyst ranges from 0.00003 mmol to 0.00005 mmol.

Propylene Polymerization Example 2

Shown in Table 2, same conditions, are a series of propylene polymerizations that demonstrate the catalyst formed from $L^8HfMe_2$ and N,N-dimethylanilium tetrakis(perfluorophenyl)borate is an active catalyst for propylene polymerization at 85 and 100° C. From runs 37 through 39 it is observed that polypropylene produced at 85° C. with this catalyst melts at 138-139° C. This is in between the melting points observed for polymers produced under identical conditions by the catalysts $L^7HfMe_2$ (see runs 31-33) and $L^9HfMe_2$ (see runs 43-45). Thus the use of pyridyldiamide ligands that contain a $C_8H_8$ (xylyl) linker group between the pyridyl ring and one of the amido nitrogens is useful for controlling polymer properties, such as melting point.

Polymerization Example 3

Shown in Table 3 are a series of polymerizations that produce ethylene homopolymer and ethylene-1-octene copolymer. These runs demonstrate that $L^1HfMe_2$, $L^7HfMe_2$, $L^8HfMe_2$, and $L^9HfMe_2$, when activated with N,N-dimethylanilium tetrakis(perfluorophenyl)borate, are capable of forming ethylene homopolymer and ethylene-octene copolymers. Conditions: isohexane solvent, 1-octene added=0.1 mL, total volume=5 mL, PDA complex=20 nmols, N,N-dimethylanilinium tetrakis(pentafluorophenyl)borate activator (1.1 equivalent), tri-n-octylaluminum (300 nmol).

TABLE 1

Propylene polymerization data. Activities given in g polymer/mmol catalyst/hour. Molecular weights are reported in g/mol.

| Run | PDA complex | polym T (° C.) | quench time (s) | yield (mg) | activity | Mw | Mn | PDI | Tm (° C.) |
|---|---|---|---|---|---|---|---|---|---|
| 1 | $L^1HfMe_2$ | 85 | 1201 | 41 | 3,071 | 15,545 | 11,104 | 1.4 | — |
| 2 | $L^1HfMe_2$ | 85 | 1201 | 27 | 2,038 | 16,772 | 11,824 | 1.4 | — |
| 3 | $L^1HfMe_2$ | 85 | 1201 | 47 | 3,516 | 19,389 | 14,018 | 1.4 | — |
| 4 | $L^1HfMe_2$ | 100 | 1201 | 22 | 1,626 | 6,169 | 4,433 | 1.4 | — |
| 5 | $L^1HfMe_2$ | 100 | 1200 | 13 | 990 | 6,045 | 4,351 | 1.4 | — |
| 6 | $L^1HfMe_2$ | 100 | 1201 | 20 | 1,521 | 5,945 | 4,308 | 1.4 | — |
| 7 | $L^2HfMe_2$ | 70 | 1801 | 20 | 812 | 13,847 | 5,324 | 2.6 | 128.6 |
| 8 | $L^2HfMe_2$ | 70 | 1801 | 13 | 532 | 12,830 | 5,371 | 2.4 | 128.9 |
| 9 | $L^2HfMe_2$ | 70 | 1803 | 23 | 915 | 14,399 | 5,506 | 2.6 | 126.4 |
| 10 | $L^2HfMe_2$ | 100 | 1801 | 4 | 176 | — | — | — | — |
| 11 | $L^2HfMe_2$ | 100 | 1802 | 2 | 88 | — | — | — | — |
| 12 | $L^2HfMe_2$ | 100 | 1801 | 2 | 68 | — | — | — | — |
| 13 | $L^3HfMe_2$ | 70 | 1802 | 16 | 639 | 38,255 | 21,949 | 1.7 | 125.5 |
| 14 | $L^3HfMe_2$ | 70 | 1801 | 15 | 580 | 40,289 | 23,413 | 1.7 | 123.3 |
| 15 | $L^3HfMe_2$ | 70 | 1801 | 13 | 532 | 38,545 | 22,285 | 1.7 | 124.0 |
| 16 | $L^3HfMe_2$ | 100 | 1802 | 2 | 68 | — | — | — | — |
| 17 | $L^3HfMe_2$ | 100 | 1801 | 3 | 104 | — | — | — | — |
| 18 | $L^3HfMe_2$ | 100 | 1801 | 1 | 44 | — | — | — | — |
| 19 | $L^4HfMe_2$ | 70 | 1800 | 22 | 868 | 38,457 | 22,526 | 1.7 | 136.8 |
| 20 | $L^4HfMe_2$ | 70 | 1801 | 19 | 771 | 37,111 | 21,854 | 1.7 | 136.7 |
| 21 | $L^4HfMe_2$ | 70 | 1802 | 26 | 1,023 | 40,266 | 24,050 | 1.7 | 135.3 |
| 22 | $L^4HfMe_2$ | 100 | 1800 | 3 | 128 | — | — | — | — |
| 23 | $L^4HfMe_2$ | 100 | 1801 | 3 | 128 | — | — | — | — |
| 24 | $L^4HfMe_2$ | 100 | 1801 | 5 | 196 | — | — | — | — |
| 25 | $L^5HfMe_2$ | 70 | 1801 | 8 | 324 | — | — | — | — |
| 26 | $L^5HfMe_2$ | 70 | 1801 | 10 | 388 | — | — | — | — |
| 27 | $L^5HfMe_2$ | 70 | 1801 | 11 | 420 | 199,866 | 8,443 | 23.7 | 143.1 |
| 28 | $L^5HfMe_2$ | 100 | 1801 | 2 | 60 | — | — | — | — |
| 29 | $L^5HfMe_2$ | 100 | 1801 | 2 | 72 | — | — | — | — |
| 30 | $L^5HfMe_2$ | 100 | 1801 | 2 | 88 | — | — | — | — |

TABLE 2

Propylene polymerization data. Activities given in g polymer/mmol catalyst/hour. Molecular weights are reported in g/mol.

| Run | PDA complex | polym T (° C.) | quench time (s) | yield (mg) | activity | Mw | Mn | PDI | Tm (° C.) |
|---|---|---|---|---|---|---|---|---|---|
| 31 | $L^7HfMe_2$ | 85 | 86 | 101 | 140,627 | 535,107 | 340,657 | 1.6 | 137.4 |
| 32 | $L^7HfMe_2$ | 85 | 75 | 94 | 150,120 | 541,980 | 345,566 | 1.6 | 137.2 |
| 33 | $L^7HfMe_2$ | 85 | 82 | 105 | 153,073 | 539,067 | 346,115 | 1.6 | 137.6 |
| 34 | $L^7HfMe_2$ | 100 | 235 | 75 | 38,045 | 278,404 | 175,965 | 1.6 | 134.7 |
| 35 | $L^7HfMe_2$ | 100 | 268 | 67 | 29,955 | 239,067 | 153,174 | 1.6 | 135.2 |
| 36 | $L^7HfMe_2$ | 100 | 189 | 80 | 50,928 | 310,049 | 196,919 | 1.6 | 135.2 |
| 37 | $L^8HfMe_2$ | 85 | 63 | 107 | 205,032 | 441,670 | 287,694 | 1.5 | 138.2 |
| 38 | $L^8HfMe_2$ | 85 | 75 | 124 | 197,713 | 493,248 | 321,213 | 1.5 | 138.7 |
| 39 | $L^8HfMe_2$ | 85 | 92 | 90 | 116,612 | 527,197 | 338,924 | 1.6 | 138.7 |
| 40 | $L^8HfMe_2$ | 100 | 221 | 84 | 45,686 | 280,933 | 185,439 | 1.5 | 136.2 |
| 41 | $L^8HfMe_2$ | 100 | 240 | 76 | 37,932 | 268,614 | 176,869 | 1.5 | 135.7 |
| 42 | $L^8HfMe_2$ | 100 | 167 | 90 | 64,610 | 278,033 | 183,602 | 1.5 | 137.0 |
| 43 | $L^9HfMe_2$ | 85 | 93 | 121 | 116,845 | 451,513 | 303,163 | 1.5 | 142.9 |
| 44 | $L^9HfMe_2$ | 85 | 77 | 108 | 127,529 | 440,739 | 312,959 | 1.4 | 142.5 |
| 45 | $L^9HfMe_2$ | 85 | 88 | 101 | 103,032 | 479,380 | 338,390 | 1.4 | 142.1 |
| 46 | $L^9HfMe_2$ | 100 | 222 | 88 | 35,530 | 247,567 | 166,447 | 1.5 | 141.8 |
| 47 | $L^9HfMe_2$ | 100 | 232 | 78 | 30,401 | 187,395 | 126,464 | 1.5 | 141.3 |
| 48 | $L^9HfMe_2$ | 100 | 149 | 92 | 55,556 | 224,220 | 154,343 | 1.5 | 141.3 |

TABLE 3

Ethylene-octene copolymerization data. Activities given in g polymer/mmol catalyst/hour/bar. Molecular weights are reported in g/mol.

| Run | PDA complex | T (° C.) | yield (mg) | P (psia) | [C8] (mM) | activity | wt % C8 | Mw | Mn | PDI | Tm (° C.) |
|---|---|---|---|---|---|---|---|---|---|---|---|
| 49 | $L^1HfMe_2$ | 80 | 32 | 75 | 0 | 5,807 | 0 | 1,725,357 | 91,358 | 18.9 | 137 |
| 50 | $L^1HfMe_2$ | 80 | 43 | 75 | 0.127 | 15,639 | 11 | 85,776 | 73,965 | 1.2 | 107 |
| 51 | $L^1HfMe_2$ | 105 | 13 | 200 | 0.127 | 92 | 6 | 52,957 | 37,883 | 1.4 | 122 |
| 52 | $L^7HfMe_2$ | 80 | 67 | 75 | 0 | 71,400 | 0 | 392,181 | 258,538 | 1.5 | 138 |
| 53 | $L^7HfMe_2$ | 80 | 80 | 75 | 0.127 | 68,461 | 25 | 474,642 | 300,977 | 1.6 | 97 |
| 54 | $L^7HfMe_2$ | 105 | 117 | 200 | 0.127 | 23,949 | 11 | 668,877 | 413,962 | 1.6 | 109 |
| 55 | $L^8HfMe_2$ | 80 | 72 | 75 | 0 | 127,978 | 0 | 374,908 | 239,351 | 1.6 | 137 |
| 56 | $L^8HfMe_2$ | 80 | 99 | 75 | 0.127 | 74,875 | 30 | 432,802 | 270,862 | 1.6 | 98 |
| 57 | $L^8HfMe_2$ | 105 | 34 | 200 | 0.127 | 10,154 | 3 | 552,372 | 350,942 | 1.6 | 119 |
| 58 | $L^9HfMe_2$ | 80 | 65 | 75 | 0 | 124,633 | 0 | 310,188 | 222,635 | 1.4 | 135 |
| 59 | $L^9HfMe_2$ | 80 | 96 | 75 | 0.127 | 57,625 | 30 | 415,923 | 279,207 | 1.5 | 96 |
| 60 | $L^9HfMe_2$ | 105 | 67 | 200 | 0.127 | 35,209 | 7 | 494,380 | 325,218 | 1.5 | 113 |

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, whenever a composition, an element, or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

The invention claimed is:

1. A pyridyldiamide metal catalyst component having the general formula (5) or (6):

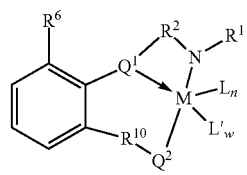

(5)

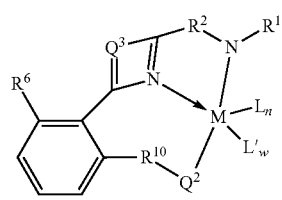

(6)

wherein:

M is a Group 3-12 metal;

$Q^1$ is a three atom bridging group by the formula $-G^1-G^2-G^3-$, each of which may be independently substituted with $R^{30}$ and $R^{31}$ groups, where $G^2$ is a group 15 or 16 atom, $G^1$ and $G^3$ are each a group 14, 15 or 16 atom, where $G^1$, $G^2$ and $G^3$, or $G^1$ and $G^2$, or $G^1$ and $G^3$, or $G^2$ and $G^3$ may form a singular or multi ring system, and if any of $G^1$ and/or $G^3$ is a group 14 atom then $R^{30}$ and $R^{31}$ are bound to such G atom(s), and if any of $G^1$, $G^2$ and/or $G^3$ is a group 15 atom then $R^{30}$ is bound to such G atom(s), where each $R^{30}$ and $R^{31}$ is, independently, hydrogen or a $C_1$ to $C_{20}$ or $C_{50}$ or $C_{100}$ hydrocarbyl group;

$Q^2$ is a group that forms a bond with M, including but not limited to a group 16 element (such as O or S) or $NR^{17}$ or $PR^{17}$, where $R^{17}$ is selected from hydrogen, hydrocarbyls, substituted hydrocarbyls, alkoxy, aryloxy, halogen, amino, and silyl;

$Q^3$ is -(TT)- or -(TTT)-, where each T is carbon or a heteroatom, and each carbon or heteroatom may independently be substituted by hydrogen or one or more $R^{30}$ groups, and as part of the "—C-$Q^3$=C—" fragment forms a 5- or 6-membered cyclic group or a polycyclic group including the 5 or 6 membered cyclic group;

$R^1$ is selected from the group consisting of hydrocarbyls, substituted hydrocarbyls, silyl, or substituted silyl groups;

$R^6$ is selected from groups containing 1 to 12 carbons;

$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

L is an anionic leaving group, where the L groups may be the same or different and any two L groups may be linked to form a dianionic leaving group, and n is 0, 1, 2, 3, or 4; and L' is neutral Lewis base, and w is 0, 1, 2, 3, or 4.

2. The pyridyldiamide metal catalyst component of claim 1, wherein $R^1$ is selected from phenyl and substituted phenyl, wherein the substitutions are selected from $C_1$ to $C_5$ hydrocarbyls, and can reside in any of the ortho, meta, para positions on the phenyl ring.

3. The pyridyldiamide metal catalyst component of claim 1, wherein $R^{11}$ is selected from phenyl and substituted phenyl, wherein the substitutions are selected from $C_1$ to $C_5$ hydrocarbyls, and can reside in any of the ortho, meta, para positions on the phenyl ring.

4. The pyridyldiamide metal catalyst component of claim 1, wherein $R^6$ is selected from methyl, ethyl, propyl, isopropyl, butyl, sec-butyl, and tert-butyl.

5. The pyridyldiamide metal catalyst component of claim 1, wherein M is hafnium or zirconium.

6. A process to produce olefins comprising combining the pyridyldiamide metal catalyst component of claim 1 with any one of or combination of ethylene and $C_3$ to $C_{12}$ olefins at a temperature from 60° C. to 140° C.

7. A process to produce polypropylene using a pyridyldiamide metal catalyst component, comprising combining propylene, and optionally ethylene or $C_4$ to $C_{12}$ olefins, with an activator and the catalyst component of claim 1.

8. The pyridyldiamide metal catalyst component of claim 1, wherein the catalyst component is represented by the formula (7):

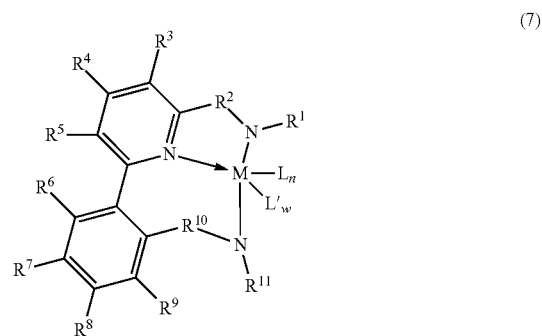

(7)

wherein:

M is a Group 3, 4 or 5 metal;

$R^1$ and $R^{11}$ are independently selected from the group consisting of hydrocarbyls, substituted hydrocarbyls, silyl, or substituted silyl groups;

$R^2$ and $R^{10}$ are each, independently, -E($R^{12}$)($R^{13}$)— with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ and $R^4$, and/or $R^4$ and $R^5$) may be joined to form a substituted or unsubstituted hydrocarbyl or heterocyclic ring, where the ring has 5, 6, 7, or 8 ring atoms and where substitutions on the ring can join to form additional rings;

$R^6$ is selected from $C_1$ to $C_{12}$ hydrocarbyls;

$R^7$, $R^8$, and $R^9$ are independently selected from the group consisting of hydrogen, hydrocarbyls, substituted hydrocarbyls, alkoxy, halogen, amino, and silyl, and wherein adjacent R groups ($R^6$ and $R^7$ and/or $R^8$ and $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group, and n is 0, 1, 2, 3, or 4; and L' is neutral Lewis base, and w is 0, 1, 2, 3, or 4.

9. The pyridyldiamide metal catalyst component of claim 8, wherein $R^1$ is selected from phenyl and substituted phenyl, wherein the substitutions are selected from $C_1$ to $C_5$ hydrocarbyls, and can reside in any of the ortho, meta, para positions on the phenyl ring.

10. The pyridyldiamide metal catalyst component of claim 8, wherein $R^{11}$ is selected from phenyl and substituted phenyl, wherein the substitutions are selected from $C_1$ to $C_5$ hydrocarbyls, and can reside in any of the ortho, meta, para positions on the phenyl ring.

11. The pyridyldiamide metal catalyst component of claim 8, wherein M is hafnium or zirconium.

12. A process to produce olefins comprising combining the pyridyldiamide metal catalyst component of claim 8 with any one of or combination of ethylene and $C_3$ to $C_{12}$ olefins at a temperature from 60° C. to 140° C.

13. A process to produce polypropylene using a pyridyldiamide metal catalyst component, comprising combining propylene, and optionally ethylene or $C_4$ to $C_{12}$ olefins, with a catalyst component and activator, the catalyst component comprising (8):

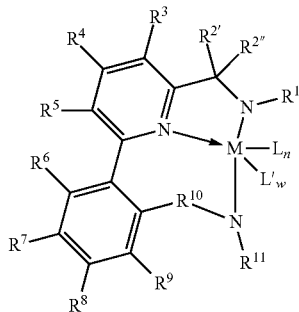

(8)

wherein:

M is a Group 3, 4 or 5 metal;

$R^1$ and $R^{11}$ are independently selected from the group consisting of hydrocarbyls, substituted hydrocarbyls, silyl, or substituted silyl groups;

$R^{2'}$ and $R^{2''}$ are selected independently from hydrogen and $C_1$ to $C_6$ hydrocarbyls;

$R^{10}$ is $-E(R^{12})(R^{13})-$, with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ and $R^4$, and/or $R^4$ and $R^5$) may be joined to form a substituted or unsubstituted hydrocarbyl or heterocyclic ring, where the ring has 5, 6, 7, or 8 ring atoms and where substitutions on the ring can join to form additional rings;

$R^6$ is selected from $C_1$ to $C_{12}$ hydrocarbyls;

$R^7$, $R^8$, and $R^9$ are independently selected from the group consisting of hydrogen, hydrocarbyls, substituted hydrocarbyls, alkoxy, halogen, amino, and silyl, and wherein adjacent R groups ($R^6$ and $R^7$ and/or $R^8$ and $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group, and n is 0, 1, 2, 3, or 4;

L' is neutral Lewis base, and w is 0, 1, 2, 3, or 4; and wherein as the steric hindrance created in the $R^6$ group, with respect to the $R^5$ group, is increased, the peak melting point temperature of the polypropylene produced increases within a range of from 120° C. to 150° C.

14. The process of claim 13, wherein $R^{2'}$ and $R^{2''}$ are hydrogen or methyl.

15. The process of claim 13, wherein $R^7$ is hydrogen and $R^6$ is selected from methyl, ethyl, propyl, isopropyl, butyl, sec-butyl, and tert-butyl.

16. The process of claim 13, wherein the polypropylene has a molecular weight distribution (Mw/Mn) of less than 2.5.

17. The process of claim 13, wherein $R^{2'}$ and $R^{2''}$ are each methyl and the activity of the catalyst component is greater than 20,000 g polymer/mmol catalyst/hour.

18. A process to produce polypropylene using a pyridyldiamide metal catalyst component, comprising combining propylene, and optionally ethylene or $C_4$ to $C_{12}$ olefins, with a catalyst component and activator, the catalyst component comprising (8):

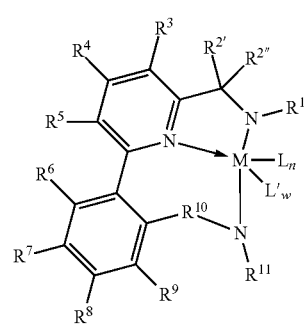

(8)

wherein:

M is a Group 3, 4 or 5 metal;

$R^1$ and $R^{11}$ are independently selected from the group consisting of hydrocarbyls, substituted hydrocarbyls, silyl, or substituted silyl groups;

$R^{2'}$ and $R^{2''}$ are selected independently from hydrogen and $C_1$ to $C_6$ hydrocarbyls;

$R^{10}$ is $-E(R^{12})(R^{13})-$, with E being carbon, silicon, or germanium, and each $R^{12}$ and $R^{13}$ being independently selected from the group consisting of hydrogen, hydrocarbyls, substituted hydrocarbyls, alkoxy, silyl, amino, aryloxy, halogen, and phosphino, $R^{12}$ and $R^{13}$ may be joined to form a saturated, substituted or unsubstituted hydrocarbyl ring, where the ring has 4, 5, 6, or 7 ring carbon atoms and where substitutions on the ring can join to form additional rings, or $R^{12}$ and $R^{13}$ may be joined to form a saturated heterocyclic ring, or a saturated substituted heterocyclic ring where substitutions on the ring can join to form additional rings;

$R^3$, $R^4$, and $R^5$ are independently selected from the group consisting of hydrogen, hydrocarbyls, substituted hydrocarbyls, alkoxy, aryloxy, halogen, amino, and silyl, and wherein adjacent R groups ($R^3$ and $R^4$, and/or $R^4$ and $R^5$) may be joined to form a substituted or unsubstituted hydrocarbyl or heterocyclic ring, where the ring has 5, 6, 7, or 8 ring atoms and where substitutions on the ring can join to form additional rings;

$R^6$ is selected from methyl, ethyl, propyl, isopropyl, butyl, sec-butyl, and tert-butyl;

$R^7$, $R^8$, and $R^9$ are independently selected from the group consisting of hydrogen, hydrocarbyls, substituted hydrocarbyls, alkoxy, halogen, amino, and silyl, and wherein adjacent R groups ($R^6$ and $R^7$ and/or $R^8$ and $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group, and n is 0, 1, 2, 3, or 4;

L' is neutral Lewis base, and w is 0, 1, 2, 3, or 4; and wherein as the steric hindrance created in the $R^6$ group, with respect to the $R^5$ group, is increased, the peak melting point temperature of the polypropylene produced increases within a range of from 120° C. to 150° C.

19. The process of claim 18, wherein $R^{2'}$ and $R^{2''}$ are hydrogen or methyl.

20. The process of claim 18, wherein $R^7$ is hydrogen and $R^6$ is selected from methyl, ethyl, propyl, and isopropyl.

21. The process of claim 18, wherein the polypropylene has a molecular weight distribution (Mw/Mn) of less than 2.5.

22. The process of claim 18, wherein $R^{2'}$ and $R^{2''}$ are each methyl and the activity of the catalyst component is greater than 20,000 g polymer/mmol catalyst/hour.

* * * * *